United States Patent
O'Toole, Jr.

(10) Patent No.: US 8,180,051 B1
(45) Date of Patent: May 15, 2012

(54) METHODS AND APPARATUS FOR SECURING COMMUNICATIONS OF A USER OPERATED DEVICE

(75) Inventor: James W. O'Toole, Jr., Somerville, MA (US)

(73) Assignee: Cisco Technology, Inc, San Jose, CA (US)

(*) Notice: Subject to any disclaimer, the term of this patent is extended or adjusted under 35 U.S.C. 154(b) by 773 days.

(21) Appl. No.: 10/265,983

(22) Filed: Oct. 7, 2002

(51) Int. Cl.
*H04K 1/00* (2006.01)
*H04L 9/08* (2006.01)
*G08B 29/00* (2006.01)
*H03M 11/00* (2006.01)
*G06F 13/38* (2006.01)

(52) U.S. Cl. .......... 380/255; 380/270; 380/285; 726/34; 341/22; 710/73

(58) Field of Classification Search .................. 713/182; 380/270, 273, 255, 285; 726/34; 341/22; 710/73, 62, 67, 72
See application file for complete search history.

(56) References Cited

U.S. PATENT DOCUMENTS

| | | | | |
|---|---|---|---|---|
| 4,608,486 A * | 8/1986 | Berstein et al. | ............... | 235/380 |
| 5,060,263 A * | 10/1991 | Bosen et al. | ............... | 713/184 |
| 5,351,296 A | 9/1994 | Sullivan | ............... | 380/24 |
| 5,517,569 A * | 5/1996 | Clark | ............... | 380/52 |
| 5,535,276 A * | 7/1996 | Ganesan | ............... | 713/155 |
| 5,557,346 A * | 9/1996 | Lipner et al. | ............... | 380/286 |
| 5,559,889 A * | 9/1996 | Easter et al. | ............... | 380/30 |
| 5,596,718 A * | 1/1997 | Boebert et al. | ............... | 726/16 |
| 5,748,888 A * | 5/1998 | Angelo et al. | ............... | 726/26 |
| 5,815,577 A * | 9/1998 | Clark | ............... | 380/52 |
| 5,822,435 A * | 10/1998 | Boebert et al. | ............... | 713/192 |
| 5,953,422 A * | 9/1999 | Angelo et al. | ............... | 713/185 |
| 6,134,661 A * | 10/2000 | Topp | ............... | 726/18 |
| 6,308,887 B1 * | 10/2001 | Korman et al. | ............... | 235/379 |
| 6,311,165 B1 * | 10/2001 | Coutts et al. | ............... | 705/21 |
| 6,314,409 B2 * | 11/2001 | Schneck et al. | ............... | 705/54 |
| 6,473,613 B2 * | 10/2002 | Beamish et al. | ............... | 455/435.1 |
| 6,580,815 B1 * | 6/2003 | Grajewski et al. | ............... | 382/124 |
| 6,581,162 B1 * | 6/2003 | Angelo et al. | ............... | 713/193 |
| 6,732,278 B2 * | 5/2004 | Baird et al. | ............... | 726/7 |
| 6,816,970 B2 * | 11/2004 | Morgan et al. | ............... | 713/183 |
| 6,948,065 B2 * | 9/2005 | Grawrock | ............... | 713/168 |
| 6,976,167 B2 * | 12/2005 | Nenashev | ............... | 713/168 |
| 7,020,778 B1 * | 3/2006 | Miettinen et al. | ............... | 713/182 |
| 7,023,996 B2 * | 4/2006 | Stephenson et al. | ............... | 380/270 |
| 7,028,191 B2 * | 4/2006 | Michener et al. | ............... | 713/182 |
| 7,142,674 B2 * | 11/2006 | Brickell | ............... | 380/44 |
| 7,224,801 B2 * | 5/2007 | Abdo et al. | ............... | 380/270 |
| 7,305,075 B2 * | 12/2007 | Harris | ............... | 379/142.01 |
| 7,706,838 B2 * | 4/2010 | Atsmon et al. | ............... | 455/558 |
| 2002/0035687 A1 * | 3/2002 | Skantze | ............... | 713/168 |
| 2002/0080967 A1 * | 6/2002 | Abdo et al. | ............... | 380/270 |

(Continued)

*Primary Examiner* — Zachary A Davis
(74) *Attorney, Agent, or Firm* — Patterson & Sheridan, LLP

(57) ABSTRACT

A system provides secure communications between a user operated device and a computerized device. The user operated device transfers an enable security message to the computerized device, and in response, the computerized device sends a first communications enablement message to the user operated device and displays a second communications enablement message on a display of the computerized device for viewing by a user operating the user operated device. The user operated device receives the first communications enablement message from the computerized device and receives the second communications enablement message from the user and establishes a secure communications session between the user operated device and the computerized device using the first communications enablement message and the second communications enablement message. The communications enablement messages can contain key material that enable encryption between the user operated device and the computerized device.

28 Claims, 7 Drawing Sheets

U.S. PATENT DOCUMENTS

| | | | |
|---|---|---|---|
| 2002/0146127 A1* | 10/2002 | Wong | 380/270 |
| 2003/0196084 A1* | 10/2003 | Okereke et al. | 713/156 |
| 2004/0034790 A1* | 2/2004 | Aissi | 713/200 |
| 2004/0049685 A1* | 3/2004 | Jaloveczki | 713/182 |

* cited by examiner

METHODS AND APPARATUS FOR SECURING COMMUNICATIONS OF A USER OPERATED DEVICE

BACKGROUND OF THE INVENTION

Conventional computerized devices frequently require the ability to interoperate with individual users using one or more user operated input-output devices. By way of example, a conventional computer system such as a personal computer or workstation typically includes one or more user operated input-output devices, such as a keyboard and a mouse. The keyboard and mouse allow a user, via manipulation of input mechanisms on the keyboard (e.g., pressing of keys) and/or the mouse (e.g., pressing of buttons and movement of mouse), to input information into the computerized device. In addition, in some circumstances, a computerized device is able to output information to a user operated device in order to control functionality within the user operated device. As an example, a computer system can provide signaling information to a keyboard device in order to activate or deactivate certain function keys within the keyboard or to enable or disable (e.g., turn on or turn off) light emitting displays or diodes within the keyboard device in order to signal the user of certain events such as the enablement of a CAPS LOCK, SHIFT LOCK or NUM LOCK key.

Data communications that take place between conventional user operated input-output devices and computerized devices are typically carried out by rather simple signaling protocols over a dedicated interface. As an example, when a user depresses a specific key on a conventional keyboard, a microprocessor or other hardware or circuitry within the keyboard translates this key press into a specific key code associated with that key. The processor then transmits this code as a signal over the communications medium such as the keyboard cable or a wireless link that couples the keyboard device to a dedicated keyboard interface within the computerized device. Since each key on a keyboard is assigned a unique key code, the computerized device receiving a series of key codes corresponding to key presses provided by a user is capable of translating these codes into a predetermined alpha numeric text code such as the American Standard Code for Information Interchange (ASCII). The circuitry then sends electrical signals representing these keystrokes to the computer system. A software application receiving such codes from the keyboard interface within the computerized device can interpret this information as input from the user. Other devices such as a mouse or joystick or gaming control device can operate one or more potentiometer that circuitry within the user operated device samples as a rapid frequency. Each sample can be transmitted to the computer system to provide a continuous stream of input from the user into the computer system.

Certain other conventional technologies provide secure communications between user operated devices such as telephones. In one such conventional technology, a key issuing organization such as a government entity (e.g., the National Security Agency) issues (i.e., provides) a physical key device to an owner/user of a secure telephone unit (STU). The key device issued to the user of the secure telephone unit includes a microchip that contains an embedded cryptographic key specifically assigned to that user. When the user is engaged in a non-secure telephone conversation using his or her STU with another user that is also talking on a similarly configured STU, each user can verbally agree to enter into a secure voice conversation. Upon doing so, each user can insert his or her key device into the STU. Each STU reads the cryptographic key information from the microchip embedded in the key device for that user in order to provide secure communications between itself and the other STU under control of the other user. Specifically, upon each user inserting and activating (i.e., turning) the key device within that user's respective STU, each STU begins to listen to and rapidly digitize the voice of the respective user of that STU. Once digitized, the STU can apply the cryptographic key information from that users key device in order to encrypt the digitized version of the voice of the user for that STU. Once encrypted, the STU can transmit the key encrypted voice to the other remote STU at the other end of the telephone line connection. The remote STU can receive the encrypted voice and can use local cryptographic key information (e.g., received from the local users key) to decrypt the encrypted voice received from the remote user. Since the key information in each users key device is related, this information allows the establishment of a successful secure communications session. In this manner, each STU can engage in an digitized encrypted voice communications session allowing each user to talk securely without the fear of the digitized voice being intercepted and deciphered by a third party (e.g., a malicious individual who may be wire tapping the telephone conversation).

SUMMARY OF THE INVENTION

Conventional techniques for providing communications between user operated input output devices and computerized devices do not easily provide a mechanism to support such communications in a secure manner, such as through the use of encryption of data transmitted between the user operated device and the computerized device. Using the keyboard device discussed above as an example, conventional keyboard devices do not provide a convenient way to enable or support encryption and device authentication for communications taking place between the keyboard device and the computerized device to which the keyboard device communicates over the dedicated keyboard interface that operates according to a standardized and rather simple input protocol.

In the secure telephone unit encryption mechanism noted above, a vulnerability exists in that a key device issued to a certain user may become compromised (e.g., stolen) and used by another user to engage in secure communications. In addition, once a key device is issued to a user, there is no mechanism in place for one STU to provide to the other STU via a communications channel other than the telephone connection information that can be used to establish a secure communications session. In other words, once the key issuing organization provides a key device to each user involved in a secure communications, the key device is all that is required by the STU to enter or engage in a secure communications session. There is no additional information provided from either the issuing organization or the other STU involved in a telephone conversation that is exchanged between users in order to set up or establish a secure communications session. Since the key device is all that is required, the vulnerability noted above regarding lost or stolen key devices exists. To overcome the vulnerability, key issuing organizations can frequently reassign new synchronized key devices to users. Information within the new synchronize key device will not allow establishment of a secure communications session with a formerly issued key device containing old cryptographic key information that may be considered compromised. In this manner, by frequently performing key management techniques within an issuing organization that causes a rotation or replacement of cryptographic key information within the key devices assigned to users, compromised key devices are less of a problem in STU systems.

Returning to the discussion of user operated devices such as computer peripherals like keyboards or other input devices, the inability to support encryption between most conventional user operated devices and computerized devices to which they communicate is largely due to the simplified nature of the simple protocols and signaling mechanisms that provide for the exchange of information between an user operated input device such as a keyboard and the computerized device to which that keyboard communicates. Conventional wisdom suggests that to effectively support modern data encryption and device authentication techniques, robust and flexible communications protocols are required to encapsulate complex numerical values representing encryption keys and other information such that a malicious individual is unable to effectively intercept and interpret such communications prior to the establishment of a secure communications session. Since the conventional signaling protocols and handshaking techniques used to transfer information from a simple user operated input device such as keyboard, a mouse or another device (e.g., a joystick, electronic notepad, game control device, or the like) are rather rudimentary and have become standardized over many years of use in many hundreds of thousands or even millions of applications, little has been done to update such protocols with features such as encryption and/or authentication. In addition, a conventional analysis of existing communications techniques between user operated input devices and computerized devices would suggest that such communications mechanisms are ill-equipped to support advanced features such as encryption and/or authentication.

Individuals and commercial organizations have taken advantage of this vulnerability and have created conventional snooping or listening devices that can be quickly and inconspicuously attached to the interface that forms the coupling of the user operated input device such as a keyboard device to a computerized device. As an example, a conventional product known as the "key ghost" manufactured by KeyGhost Ltd of Christchurch, New Zeland (on the Internet at http://www.keyghost.com) provides a small electronic device that a malicious individual can quickly install by hand at the interface between a keyboard device and a computerized device. The malicious individual can quickly perform installation of the key ghost device simply by unplugging a keyboard cable in the back of a computer and then plugging the keyboard cable into the key ghost device. The individual then plugs the key ghost device into the input interface to which the keyboard cable was formerly connected. The key ghost thus "sits between" the keyboard and the computer. Thereafter, the key ghost device allows any keystrokes that a legitimate user of the keyboard device provides to the computerized device to pass through the key ghost device. In addition, the conventional key ghost device also intercepts and stores such user keystrokes in a buffer. The key ghost device can encrypt the keystroke information that it stores in the buffer so that if the key ghost device is intercepted for example by a legitimate user of the computer who discovers the installed key ghost device, that user will be unable to determine the contents of the information that the key ghost device has received. In certain implementations, the key ghost device can wirelessly transmit these keystroke interceptions to a remote location allowing the malicious individual to completely intercept an entire copy of the information that a user provides via the keyboard device to the computerized device. This information can include usernames and passwords or other sensitive information that the malicious individual can intercept via the key ghost device and can then use to compromise the security of the computerized device or another facility (e.g., a remote computer) at a later time when the user of the computerized devices not present.

Embodiments of the invention provide mechanisms and techniques that enable establishment and maintenance of a secure data communications session between a computerized device and a user operated device such as a keyboard, a mouse, a joystick, and electronic notepad or any other such user operated device while providing for backward compatibility of these devices such that the computerized device is able to communicate with the user operated device using conventional signaling techniques if required. In particular, embodiments of the invention allow a user to attach a user operated device such as a keyboard equipped with an embodiment of the invention to a conventional device interface such as a keyboard interface within the computerized device such as a personal computer or workstation. The user is able to load or otherwise install device driver software configured to operate according to one embodiment of the invention within the computerized device to allow the computerized device to perform communications with the user operated device in both a conventional manner and using a secure communications session enabled according to the embodiments of the invention as explained herein.

In particular, embodiments of the invention provide a user operated device such as a keyboard or other input device that includes a device encryption process (e.g., either as software, hardware, circuitry, a microcontroller, firmware or a combination thereof such as firmware containing software code embedded within the user operated device). The user operated device includes an enable security input mechanism which the user of the device is able to engage or otherwise invoke in order to establish a secure communications session between the user operated device and the computerized device that is in communications with the user operated device. As an example, a keyboard device equipped with an embodiment of the invention can include an internal device encryption process that is activated when a user of the keyboard device presses a special "SECURE" key on the keyboard. In one embodiment, activation of the SECURE key by the user causes the device encryption process to transfer, from the user operated device to the computerized device, an enable security message that indicates to the computerized device that the user controlling the user operated device (i.e., the user at the keyboard) desires to establish a secure communications session between the user operated device and the computerized device.

In response, a secure device driver process operating within the computerized device according to embodiments of the invention can receive the enable security message and can send a first communications enablement message to the user operated device. In one embodiment of the invention, the first communications enablement message includes first key material used to establish secure communications session between the user operated device and the computerized device. In another embodiment of the invention, the first key material is a first portion of a public key transmitted to the user operated device from the computerized device. In an alternative embodiment of the invention, the first key material is a complete public key transmitted to the user operated device from the computerized device. The first key material can be any information that that can be used to initiate a secure communications session using encryption technologies.

In addition to transferring the first communications enablement message to the user operated device, the secure device driver process operating in the computerized device causes the computerized device to display, on a display device in communications with the computerized device such as a computer monitor or other visual display, a second communications enablement message for viewing by the user operating the user operated device. The second communications enablement message includes second key material that is also used to establish a secure communications session between the user operated device and the computerized device. The user of the user operated device is able to view the display device of the computerized device and is able to input, via typing or by using any other input mechanism provided by the user operated device, the content of the second communications enablement message into the user operated device for receipt by the device encryption process operating. Thereafter, the device encryption process operating in the user operated device is able to establish a secure communications session between the user operated device and the computerized device using the first communications establishment message (i.e., received over the communications interface between the user operated device and the computerized device) and second communications establishment message (i.e., received as input from the user who enters its contents from viewing the second communications establishment message appearing on the display of the computerized device).

As an example, in one embodiment of the invention, the first key material sent to the user device may be a portion of or all of a public key used for an asymmetric public key encryption technique. The second key material that the secure device driver process presents to the user on the display of the computer system can include the remaining portion of the public key or, in situations where the entire public key was sent to the user operated device, can include a fingerprint such as a secure hash value of the entire public key or any other key verification information. The user of the user operated device that views this information on the computer display can type or otherwise enter this second key material into the user operated device through user input mechanisms on the user operated device. This allows the user to provide an alternative communications channel to input information generated from the computerized device (i.e., displayed on the computer display), as opposed to having to transmit this information over the user operated device interface (that might be compromised by a malicious individual). Using the first and second key material, the device encryption process operating within the user operated device is thus provided with an entire public key with which the device encryption process can utilize to establish a secure communications session by applying a key encryption algorithm such that communications taking place between the user operated device in the computerized device are encrypted.

It is to be understood that the first and second communications establishment messages can contain any information that can be used to establish a secure communications session between the user operated device and the computerized device and is not limited to containing public key information. As an example, the first communications establishment message can contain a challenge question that the user operated device can analyze and can expect a certain response from the user as input to the user operated device. The response can be included in the second communications establishment message for display to the user who then enters the response value. Since the user operated device receives the challenge and the response form different input sources (i.e., one from the computer and one from the user), the chances of a malicious individual compromising both input channels is significantly reduced. Accordingly, the user operated device can authenticate the challenge if the user enters a proper response and can thus be assured that the challenge and response information are accurate and not interfered with by a malicious individual listening (and potentially modifying) information on the interface between the user operated device and the computerized device. The challenge response information can be used, for example, to generate a key for use in encryption. Since the computerized device also knows both the challenge and response values, it can generate the same key in order to decrypt any information received from the user operated device in encrypted form.

In one embodiment, the first and second communications enablement messages include first and second key material respectively. The user operated device that receives the first and second key material via the different input channels (one from the user, the other from the computer) can combine the first key material and the second key material to form a complete public key. The user operated device can then perform an asymmetric key encryption algorithm using the complete public key to encrypt communications between the user operated device and the computerized device.

In another embodiment, the step of performing an asymmetric key encryption algorithm to encrypt communications between the user operated device and the computerized device comprises the steps of receiving subsequent user input from the user operating the user operated device. The subsequent input can be any user input that is supposed to be transferred to the computerized device in a secure manner, and can include keystrokes, button presses, movement information related to a position of a mouse or joystick or other electro-mechanical control device, and the like. The user operated device encrypts the subsequent user input to form encrypted user operated device output. The user operated device then transmits, from the user operated device to the computerized device, the encrypted user operated device output for receipt and subsequent decryption by the computerized device. In one embodiment, the step of encrypting the subsequent user input to form encrypted user operated device output comprises the step of encrypting the subsequent user input using the complete public key.

In another embodiment, the step of performing an asymmetric key encryption algorithm to encrypt communications between the user operated device and the computerized device comprises the steps of creating a session key for use in encrypting user input from the user operating the user operated device and encrypting the session key with the complete public key to produce an encrypted session key. The method then communicates the encrypted session key to the computerized device for receipt and subsequent decryption by the computerized device using a private key maintained by the computerized device. The private key is associated with the complete public key. Thereafter, the step of encrypting the subsequent user input comprises the step of encrypting the subsequent user input using the session key such that the encrypted user operated device output can be decrypted by the computerized device using the session key communicated to and decrypted by the computerized device. Use of a session key thus provides a further level of security. In addition, the session key, which may be a symmetric-based encryption key, can be transferred between two endpoints using an asymmetric cryptographic key such as the public key as noted in the above embodiment so that the session key is known to both endpoints. This allows a faster symmetric encryption/decryption algorithm to be used in the user operated device and the computerized device to provide an overall faster secure communications session. In high bandwidth applications where large amounts of data may be required to be encrypted or in situations where processing power may be limited (e.g., in a keyboard device), symmetric key encryption techniques may be faster and better performing.

In another embodiment, the first key material is a complete public key transmitted to the user operated device from the computerized device and the second key material contains a fingerprint such as a secure hash of the first key material that the computerized device displays on an output device of the computerized device and that the user of the user operated device can see and can provide as input to the user operated device for receipt in the step of receiving the second communications enablement message. The step of applying a key encryption algorithm using the first and second key material comprises the steps of applying a fingerprint function to the first key material to produced fingerprinted first key material and then comparing the fingerprinted first key material to the fingerprint of the first key material contained in the second key material to validate the complete public key received in the first key material. The method then performs an asymmetric key encryption algorithm using the complete public key to encrypt communications between the user operated device and the computerized device. In this manner, the computer can send the entire public key to the user operated device, and can send verifying information called a fingerprint to the computer display that the user can see and then type into or otherwise enter into the user operated device. The user operated device can use the fingerprint function to verify the content of the public key received in the first communications enablement message, thus detecting any modification of this information. In another embodiment, the fingerprint of the first key material is a secure hash of at least a portion of the first key material.

In yet another embodiment, the step of applying a key encryption algorithm using the first and second key material to establish an encrypted communications session between the user operated device and the computerized device comprises the steps of applying a data modification technique such as cipher block chaining technique or a data padding technique to the key encryption algorithm such that two identical portions of subsequent user input received from the user operating the user operated device are transferred from the user operated device to the computerized device using different encrypted user operated device outputs. In this embodiment, the data modification technique or algorithm ensures that two user inputs that are the same, such as two keystrokes of the same letter on a keyboard, are sent to the computerized device using different encrypted values such that an eavesdropping malicious individual cannot detect patterns in the encrypted data.

In one embodiment of the invention, the data modification technique is a cipher block chaining technique that applies a synchronized cipher update to user input received from the user operating the user operated device in order to modify the user input according to the cipher update such that two identical user inputs become differentiated when encrypted.

In another embodiment of the invention, the data modification technique is a data padding technique that associates padding data to see user input received from the user operating the user operated device in order to differentiate two identical user inputs such that their encrypted equivalents are differentiated.

In a further embodiment, the step of transferring an enable security message comprises the step of receiving an enable security input from the user operating the user operated device. The enable security input indicates that the user operating the user operated device desires to establish the secure communications session between the user operated device and the computerized device. This allows the user to activate the secure session via an input mechanism that indicates to the computer that the user desires to engage in the secure session. The enable security input may be a special key on a keyboard, or can be a special combination of keystrokes, or a special movement of a mechanical input device such as a mouse (e.g., four quick right hand circles followed by three reverse quick left hand signals). The enable security input should be an input pattern that would not normally occur in typical use of the user operated device.

In another embodiment, the step of establishing a secure communications session between the user operated device and the computerized device comprises the steps of activating a secure indicator to indicate to the user of the user operated device that the user operated device has established a secure communications session between the user operated device and the computerized device. This can include turning on a light, sounding a tone, vibrating the user operated device in a predetermined pattern (e.g., three successive vibrations of a hand held input device), or providing any other sensory signal to the user to indicate to the user that the device is now communicating securely with the computerized device. Note that the signal to indicate that a secure session has been established can come from the computerized device or can be generated within the user operated device once confirmation of establishment of the secure session is complete.

In another embodiment, the user operated device receives, as input from a user operating the user operated device, a disable security message. The disable security message can be any input to the user operated device that indicates that the user no longer wants to communicate securely. In response to the step of receiving the disable security message, this method embodiment disestablishes the secure communications session between the user operated device and the computerized device such that user operated device and the computerized device can communicate in a non-secure manner. As an example, the user may engage the secure session to enter a special username and password combination. Once entered, the user may then provide the disable security message for example by again pressing the secure key, such that the user operated In another embodiment, the step of establishing a secure communications session between the user operated device and the computerized device comprises the step of applying at least one of a symmetric key encryption technique, an asymmetric key encryption technique, and/or a cipher block chaining technique to establish and maintain the encrypted communications session between the user operated device and the computerized device such that subsequent user input received by the user operated device is encrypted and transmitted to the computerized device as encrypted user operated device output.

Other embodiments of the invention operate in a computerized device and provide a method for establishing a secure communications session between the computerized device and a user operated device in communications with the computerized device. One such method comprises the steps of receiving an enable security message from the user operated device in communications with the computerized device. In response, the method sends a first communications enablement message to the user operated device and displays, on a display device in communications with the computerized device, a second communications enablement message for viewing by a user operating the user operated device. The method also establishes a secure communications session between the user operated device and the computerized device based on the first communications enablement message and/or the second communications enablement message.

In another embodiment, the first communications enablement message includes first key material used to establish the secure communications session between the user operated device and the computerized device and the second communications enablement message includes second key material used to establish the secure communications session between the user operated device and the computerized device. The step of establishing a secure communications session between the user operated device and the computerized device using the first communications enablement message and the second communications enablement message comprises the step of applying a key encryption algorithm using at least one of the first and second key material to establish an encrypted communications session between the user operated device and the computerized device such that communications taking place between the user operated device and the computerized device are encrypted.

In a further embodiment, the first key material includes a complete public key and the second key material includes a fingerprint of the complete public key that the step of displaying displays on the display in communications with the computerized device. This allows the user to enter the fingerprint for verification of the public key received by the user operated device.

In another embodiment, the first key material includes a portion of a complete public key and the second key material includes a remaining portion of the complete public key that the step of displaying displays on the display in communications with the computerized device. This allows the user to enter part of the public key that the user sees on the computer display, and the user operated devices receives the other part from the computer.

In another embodiment, the step of applying a key encryption algorithm using at least one of the first and second key material to establish an encrypted communications session between the user operated device and the computerized device comprises the step of applying a cipher block chaining technique to the key encryption algorithm such that two identical portions of subsequent user input received from the user operated device as respective different encrypted user operated device outputs are decrypted back into the two identical portions of subsequent user input. Thus the computerized device can use the cipher block chaining technique to decrypt user input that was encrypted with the same cipher block chaining technique, such as a rolling cipher.

Other embodiments provide a computerized device comprising at least one user operated device communications interface, a memory, a processor and an interconnection mechanism coupling the communications interface, the memory and the processor. In the computerized device, the memory is encoded with secure device driver application that when performed on the processor, produces a secure device driver process that causes the computerized device to establish a secure communications session with the user operated device by performing the processing steps outlined above and explained in detail here with respect to establishing a secure communications session.

The computerized device may be any type of computer or electronic device, hardware device, peripheral device or other device configured with software and/or circuitry accept a connection from a user operated device and to process and perform all of the method operations noted above and disclosed herein as embodiments of the invention that are related to the computerized device. In other words an electronic device such as a computer that is programmed with a secure device driver application and/or process or is in any way otherwise configured to operate as explained herein is considered an embodiment of the invention.

Other embodiments provide a user operated device comprising at least one communications interface, a memory, a processor and an interconnection mechanism coupling the communications interface, the memory and the processor. In the user operated device, the memory is encoded with device encryption application that when performed on the processor, produces a device encryption process that causes the user operated device to establish a secure communications session with a computerized device by performing the processing steps outlined above and explained in detail here with respect to establishing a secure communications session.

The user operated device may be any type of computer or electronic device that can be controlled by a user to receive input and may include a hardware device, peripheral device, keyboard or other input device or other device configured with software and/or circuitry accept input from a user and to process and perform all of the method operations noted above and disclosed herein as embodiments of the invention that are related to the user operated device to transfer the input to a computerized device in a secure manner. In other words an electronic device such as a keyboard or other input device that is programmed or otherwise configured with a device encryption application and/or process or is in any way otherwise configured to operate as explained herein is considered an embodiment of the invention.

Other arrangements of embodiments of the invention that are disclosed herein include software programs to perform the method embodiment steps and operations summarized above and disclosed in detail below for both the user operated device and for the computerized device, including the device encryption process and the secure device driver application and process. More particularly, a computer program product is disclosed which has a computer-readable medium including computer program logic encoded thereon that, when executed on at least one processor with a computerized device or within a user operated device, causes the processor to perform the operations (e.g., the methods and processing steps) indicated herein that are considered embodiments of the invention for the computerized device and the user operated device. Software programs that perform the functions of the secure device driver process and the device encryption process are considered embodiments of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system or user operated device to cause such devices to perform the techniques explained herein as embodiments of the invention.

The embodiments of the invention may be implemented by computer software and/or hardware mechanisms within a computing apparatus and within any user operated device. It is to be understood that the embodiments of the invention can be embodied strictly as a software program, as software and hardware, or as hardware and/or circuitry alone. The features of the invention, as explained herein, may be employed in user operated devices and computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the invention provide mechanisms and techniques that enable establishment and maintenance of secure data communications between a computerized device and a user operated device such as a keyboard, a mouse, a joystick, an electronic notepad or other such user operated input device while providing for backward compatibility such that the computerized device is able to communicate with the user operated device using conventional signaling techniques, if required. In particular, embodiments of the invention allow a user to attach a user operated device, such as a keyboard or any other user operated input-output device equipped with an embodiment of the invention to a conventional device interface (e.g., a conventional keyboard interface if the device is a keyboard, a conventional mouse interface, if the device is a mouse, and so forth) within the computerized device such as a personal computer or workstation. The user is able to load or otherwise install secure device driver software configured to operate according to embodiments of the invention within the computerized device to allow the computerized device to perform communications with the user operated device in both a conventional manner and using a secure communications session enabled according to the embodiments of the invention explained herein.

Embodiments of the invention allow the secure communications session to be established between the computerized device and the user operated device even though a malicious individual may be intercepting or otherwise monitoring communications between the user operated device and the computerized device. This is because embodiments of the invention operate to provide communications enablement messages between the computerized device and the user operated device over separate communications channels. These messages can be used to establish the secure communications session. Since they are provided over separate input channels, even if a malicious individual were to be monitoring communications over the communications interface between the user operated device and the computerized device, the malicious individual would not obtain enough information necessary to decrypt or otherwise make sense of encrypted information transferred between the devices once the secure communications session is established.

Figure 1:
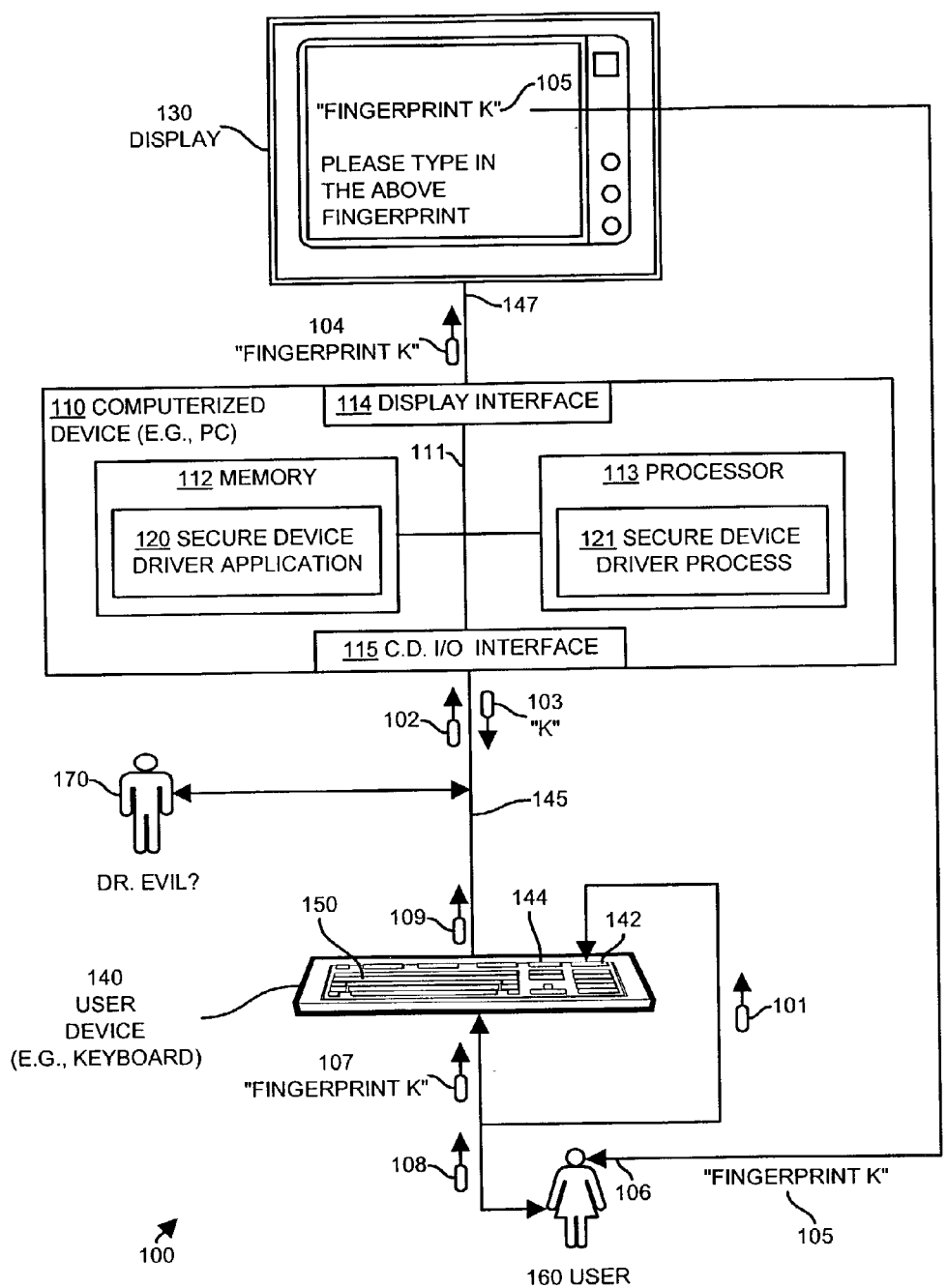
FIG. 1 illustrates a computing system environment 100 including a user operative device and a computerized device configured in accordance with embodiments of the invention.

FIG. 1 illustrates an example of a computing system environment 100 configured to operate according to one example embodiment of invention. The computing system environment 100 includes a user operated device 140 coupled to a computerized device 110 via a communications link 145. The computerized device 110 is also coupled via a communications link 147 to a display 130 such as a computer monitor that is capable of displaying output from the computerized device 110. A user 160 is able to provide user input to the user operated device 140 by mechanically manipulating an input mechanism of the user operated device 140. In this example, the user operated device 140 is illustrated as a keyboard device and thus the user 160 is able to provide user keystroke input to the keyboard by typing or depressing keys on the keyboard device. It is to be understood that the user operated device does not have to be a keyboard but rather, may be any device that includes an input mechanism that allows a human user to provide input for transmission to a computerized device or other electronic component over a physical or wireless communications link 145. Other examples of a user operated device are a mouse, a joystick or other electro-mechanical controller, an electronic notepad or touchpad, a numeric keypad, a microphone, or any other input mechanism. Generally, in operation, the user operated device 140 receives the user input and transfers the user input to the computerized device 110 over the communications link 145, which may be a physical cable or a wireless communications link that transfers the user input to the computerized device 110 according to a keyboard protocol or other signaling mechanism optimized for the user operated device 140.

In addition to being able to send user input to the computerized device 110 using conventional communications techniques, the user operated device 140 includes a device encryption process 150 that operates within the user operated device 140 according to embodiments of the invention as will be explained. Generally, the device encryption process 150 enables the user operated device 140 to establish and maintain a secure communications session over the communications link 145 such that communications such as user input received form the user 160 and transferred between the user operated device 140 and the computerized device 110 is securely transmitted (e.g., encrypted and/or authenticated).

According to the illustrated example, the user operated device 140 includes an enable security input mechanism 142 that may be, for example, a special "SECURE" key on the keyboard. The user 160 can depress the SECURE key 142 (the enable security input mechanism) on the keyboard device 140 that causes the device encryption process 150 to indicate or signal to the computerized device 110 that the user 160 desires to enter into a secure communications session. Upon user operation of the enable security input 142, the device encryption process 150 establishes a secure communications session over the communications link 145 as explained herein. Such a secure communications session provides encryption of user input (e.g., keystrokes) transferred from the user operated device 140 to the computerized device 110. As a result of embodiments of the invention, a malicious individual 170 (Dr. Evil) that may be listening to or otherwise intercepting user input transferred over the communications link 145 will be unable to decipher, decrypt or otherwise understand the user input.

The computerized device includes an interconnection mechanism 111 such as a data bus or other circuitry that interconnects a memory system 112, a processor 113, a display interface 114 and a user operated device input output interface 115. The memory system is encoded with a secure device driver application 120 that is configured according to one embodiment the invention to interoperate with the device encryption process 150 operating within the user operated device 140. The secure device driver application 120 represents software code, data and/or logic instructions that enable the computerized device 110 to establish a secure communications session between the user operated device 140 and the computerized device 110. The processor 113 may be any type of central processing unit, microprocessor, controller of other circuitry that can access the secure device driver application 120 over the interconnection mechanism 111 in order to execute, run, interpret, operate or otherwise perform the secure device driver application 120 thus forming a secure device driver process 121 that operates according to embodiments of the invention as explained herein. In other words, the secure device driver application 120 represents a device driver software program that allows the user operated device 140 (including the device encryption process 150) to operate provide secure input to the computerized device 110 from. A user 160 can load the secure device driver application 120 onto the computerized device 110 for storage within a computer readable medium such as the memory 112 during configuration of the computerized device 110. During operation of the computerized device 110, the processor 113 can load and execute the secure device driver application 120 (thus forming the secure device driver process 121) in order to enable the computerized device 110 to operate in conjunction with the device encryption process 150 (operating in the user operated device 140) as explained herein to provide secure communications over the communications link 145.

While not specifically illustrated in FIG. 1, it is to be understood that the user operated device 140 can be configured in a manner similar to the computerized device 110 so as to include a memory, a processor and an interconnection mechanism. For such a user operated device 140, the device encryption process 150 may be comprised of a device encryption application residing in the memory such as in firmware, and a processor within the user operated device can operate to access the device encryption application to form the device encryption process 150. Alternatively, the device encryption process 150 may be embodied within hardware or circuitry within the user operated device 140.

The remaining enumerated components illustrated in FIG. 1, including messages (e.g., 101 through 109) exchanged between the user 160, the user operated device 140, the computerized device 110 and the display 130, will be explained in conjunction with a flow chart of processing steps shown in FIG. 2 that indicate processing operations performed by both the device encryption process 150 operating within the user operated device 140, and by the secure device driver process 121 operating within the computerized device 110, according to one example embodiment of the invention.

Figure 2:
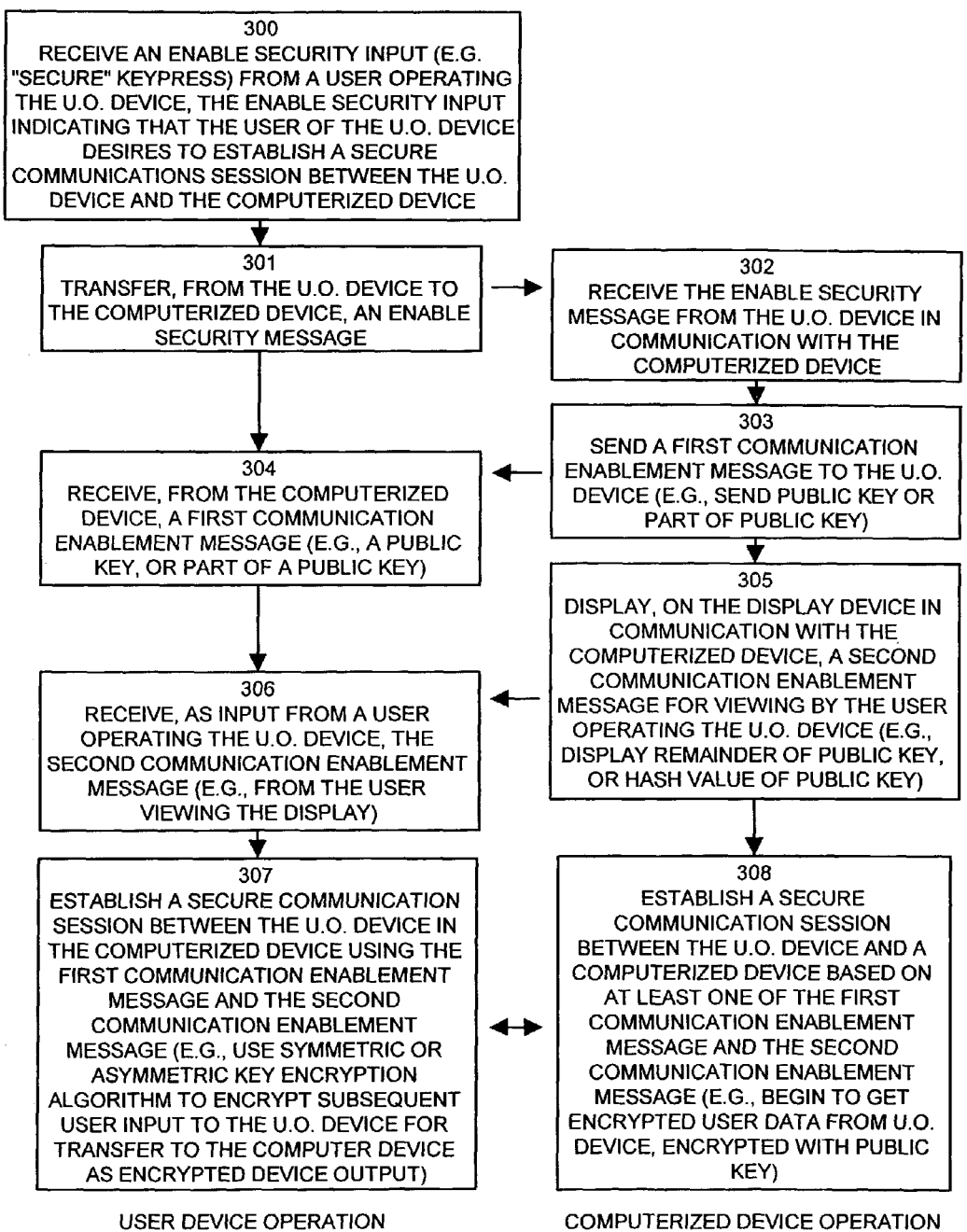
FIG. 2 is a flow chart of processing steps that show operation of both a user operated device and a computerized device each configured to operate in accordance with one example embodiment of the invention.

FIG. 2 is a flow chart of processing steps that shows processing operations performed by a user operated device 140 configured in accordance with embodiments of the invention operating in conjunction with a computerized device 110 also configured in accordance with embodiments of the invention. In particular, the processing steps on the left-hand side of the flow chart in FIG. 2 show operations performed by the user operated device 140 equipped with a device encryption process 150 whereas the processing steps on the right hand side of the flow chart in FIG. 2 show operations performed by the computerized device 150 equipped with a secure device driver process 121. The arrows between the two columns of processing steps (i.e., between the right and left-hand side flow charts) indicate transfer of control or information between the user operated device 140 and the computerized device 110. The discussion of processing steps 300 through 308 in FIG. 2 will also be explained with reference to the example computing system environment 100 illustrated in FIG. 1.

In step 300, the user operated device 140 receives an enable security input 101 from the user 160 operating the user operated device 140. The enable security input 101 indicates that the user 160 of the user operated device 140 desires to establish a secure communications session between the user operated device 140 and the computerized device 110. As an example, perhaps the user 160 is about to enter (i.e., type in) sensitive information such as a username and/or password into the computerized device 110 via the user operated device 140. The user 160 thus activates the enable security input mechanism 142 (i.e., via an enable security input key press 101 of the "SECURE" key 142 on the keyboard device 140) to begin the establishment of the secure communications session over the communications link 145. This action activates the device encryption process 150 configured in (e.g., embedded within) the user operated device 140 to perform the remaining processing steps 301, 304, 306 and 307 shown in FIG. 2.

In step 301, after receipt of the enable security input 101 via activation of the enable security input mechanism 142, the user operated device 140 (e.g., the device encryption process 150) transfers, from the user operated device 140 to the computerized device 110, an enable security message 102 as shown in FIG. 1. The enable security message 102 may be any signal or message that indicates, to the secure device driver process 121 operating within the computerized device 110, that the user 160 controlling the user operated device 140 desires, at this point in time, to enter a secure communications session with the computerized device 110 over the communications link 145.

In step 302, the computerized device 110 (i.e., the secure device driver process 121 operating therein) receives the enable security message 102 from the user operated device 140 in communications with the computerized device 110 (i.e., over the communications link 145).

In step 303, the computerized device 110 prepares and sends a first communications enablement message 103 to the user operated device 140. In one embodiment, the first communications enablement message 103 includes first key material that can be used to establish a secure communications session between the user operated device 140 in the computerized device 110. As an example, the first communications enablement message 103 can include a public key or part of a public key used for an asymmetric public key encryption process that the secure device driver process 121 transfers to the user operated device 140 over the communications link 145 in response to receiving the enable security message 102 (transferred to the secure device driver process 121 in step 301). Alternatively, the first communications enablement message 103 can contain a symmetric key used in a symmetric key encryption process, as will be explained. In yet another alternative embodiment, the first communications enablement message can contain any information that the user operated device can utilize to establish a secure communications session. This information can include, for example, a challenge message or a response to a challenge.

Next, in step 304, the user operated device 140 receives, from the computerized device 110, the first communications enablement message 103. In one embodiment, the device encryption process 150 operating within the user operated device 140 receives either the entire public key or a portion of the public key within the first communications enablement message 103. In alternative embodiments as suggested above, the device encryption process 150 can receive other information such as a challenge or response to the challenge the user operated device can use, as will be explained herein, to establish a secure communications session.

In step 305, in addition to transferring the first communications enablement message 103 to the user operated device 140, the secure device driver process 121 operating within the computerized device 110 displays, on the display device 130 in communications with the computerized device 110, a second communications enablement message 104 for viewing by the user 160 operating the user operated device 140. In one embodiment of the invention, the second communications enablement message includes second key material that can be used to establish a secure communications session between the user operated device 140 and computerized device 110. As an example, if the first communications enablement message 103 (sent from the computer 110 to the keyboard 140) contained a first portion of a public key, then the second communications enablement message 104 can contain a second portion or the remainder portion of the public key that the computerized device 110 displays on the output device 130 of the computerized device 110 such as a computer monitor or other display device that the user 160 of the user operated device 140 can see with his or her eyes. Alternatively, if the first key material in the first communications enablement message 103 is a complete (i.e., an entire) public key, the second key material in the second communications enablement message 104 that the computer device 110 displays on the display 130 can contain a fingerprint of the first key material, such as a secure hash of all or a portion of the public key. In yet another alternative, if the first communications enablement message includes a challenge, the second communications enablement message sent to the display of the computerized device can include the proper response information for the challenge. In still another alternative, if the first communications enablement message includes the response value to the challenge, the second communications enablement message can contain a challenge itself.

To this end, the relationship between the first and second communications enablement messages is that each can be used to cross-reference or verify the content of the other. As will be explained, since the user operated device receives the information for the first and second communications enablement message is over different communications channels (the first being the communications link 145 and second being the input mechanism provided by the user 160), the user operated device is capable of the processing information from the first and second communications enablement messages in order to either authenticate the value of one of these messages which can then be used to generate a key value for a key encryption algorithm or, alternatively as will be explained, the information in these messages can be combined in order to form a key value for a key encryption algorithm. Since one of the two communications enablement messages is received as input from the user, a malicious individual attempting to intercept information related to both of these messages over the communications link 145 will be unsuccessful. In addition, if the user operated device 140 is capable of verifying the content of one or both of these messages and bus, as will be explained, can generate a key for use in a key encryption algorithm, the user operated device is able to establish the secure communications session.

In the example illustrated in FIG. 1, the first communications enablement message 103 contains an entire or complete public key "K." The second communications enablement message 104 contains a fingerprint such as a secure hash of the complete public key K, providing a result "FINGERPRINT K" that computerized device 110 displays 105 on the display 130 for viewing 106 by the user 160. After processing of step 305 is complete, the user 160 can be prompted to enter, as user input 107 to the user operated device 140, the displayed information 105 contained in the second communications enablement message 104. As an example, after displaying a fingerprint 105 of the public key K, the secure device driver process 121 can prompt the user 160 to view and enter the information 105 displayed on the display 130.

In step 306, the user operated device 140 receives, as input 107 from the user 160 operating the user operated device 140, the second communications enablement message (i.e., from the user 160 viewing 106 the display 130 containing second communications enablement message information 105). In other words, in step 306, the user 160 types in or otherwise enters, using the input mechanism(s) of the user operated device 140, the information 105 contained within the second communications enablement message 104 that the computer 110 has displayed in the display 130. In this manner, the communications path of the second communications enablement message 104, from the computerized device 110 to the display 130, which is then viewed 106 by the user 160 and entered as input 107 to the user operated device 140, is out of band or unbeknownst to the malicious individual 170. Since the content 105 of the second communications enablement message 104 is used for the establishment of a secure communications session between the user operated device 140 and computerized device 110 the malicious individual 170 is unable to intercept this information 105.

As a result, in steps 307 and 308, the user operated device 140 and computerized device 110 can enter into or otherwise establish a secure communications session over the communications link 145. In particular, in step 307, the device encryption process 150 operating within the user operated device 140 establishes a secure communications session over the communications link 145 between the user operated device 140 and the computerized device 110 using (in any way required, as explained herein) the first communications enablement message 103 and the content 105 of second communications enablement message 104, entered as input 107 from the user 160 viewing this content or information 105 on the display 130. That is, in step 307, the user operated device can use the first and second communications establishment messages, for example, to verify the content of one against the other or alternatively to combined the content of each to formulate a complete public key or in any other manner that enables the device encryption process 150 to be assured that information received from one or both of the communications paths (i.e., link 145 and the user input) over which the first and second communications establishment messages arrived is uncompromised by the malicious individual 170.

Likewise, in step 308, the secure device driver process 121 operating in the computerized device 110 establishes a secure communications session between the user operated device 140 and the computerized device 110 based one or both of the first communications enablement message 103 and the second communications enablement message 104. As will be explained shortly, depending upon the embodiment of the invention, to establish a secure communications session, the user operated device 140 and the computerized device 110 can use or otherwise perform a symmetric or an asymmetric key encryption algorithm to encrypt subsequent user input 108 received from the user 160 for transfer to the computerized device 110 as encrypted user operated device output 109 over the communications link 145 in a secure manner. This allows the computerized device 110 to begin to get encrypted user data 109 from the user operated device 140 encrypted with a public key K.

As illustrated in FIG. 1, if the first communications enablement message 103 contains a public key K (i.e., an entire public key) and the second communications enablement message 104 contains a fingerprint or secure hash of that public key K, when the user 160 views 106 and then subsequently enters 107 the fingerprint of the complete public key K, the device encryption process 150 operating within the user operated device 140 can compute its own first fingerprint of the complete public key K received in the first communications enablement message 103 and can compare this first fingerprint with the second fingerprint 105 of the public key K received from the user 160 as input 107. If the two fingerprints match, the device encryption process 150 can be assured that the public key K received in the first communications enablement message 103 is accurate and has not been intercepted or interfered with by the malicious individual 170.

As explained above in the various alternative embodiments of the invention, if the first communications enablement message 103 contains a portion of the public key K and the second communications enablement message 104 contains the remaining portion of the public key K, when the user 160 views 106 and then subsequently enters 107 the remaining portion of the public key K, the device encryption process 150 operating within the user operated device 140 can combine the two portions of the public key K in order to form a complete public key K, thus allowing the device encryption process 150 to perform an asymmetric key encryption algorithm using the complete public key K (formed from the two different portions received by the user operated device 140 from different input channels) to encrypt communications between user operated device 140 in the computerized device 110. As a result of the aforementioned processing, subsequent user input 108 received at the user operated device 140 can be encrypted and transferred as encrypted user operated device output 109 which can be transmitted from the user operated device 140 to the computerized device 110 for receipt and subsequent decryption by the secure device driver process 121.

It is to be understood that alternative variations to the aforementioned embodiments can be provided that provide yet additional embodiments of the invention. As an example, the key material information within the first and second communications enablement messages 103 and 104 need not be public key material or a fingerprint or hash thereof. In an alternative configuration, key material information within the communications enablement message is 103 and 104 can be, for example, a session key, a private key, or any other type of key material information that can be used to establish encryption of user input 108 for transferring a secure manner between the user operated device 140 in the computerized device 110. Since the secure device driver process 121 provides the second communications enablement message 104 to the display 130, the malicious individual 170 is unable to intercept the content of this message 104. Accordingly, the user 160 viewing the display 130 can enter this information as input 107 which allows the device encryption process 150 operating within the user operated device 140 to retrieve and authenticate (e.g., using the secure hashing technique) the information to both validate or then to compose the necessary key material to use within a key encryption algorithm. It is to be understood that a combination of secure hashing information and a distribution of separate portions of key material may be included within each of the first and second communications enablement messages.

After the processing of FIG. 2 is complete, the device encryption process 150 operating within the user operated device 140 can activate or otherwise operate a secure indicator 144 such as an LED or lighted display visible to the user 160 on the user operated device 140 in order to indicate to the user 160 of the user operated device 140 at the user operated device 140 has successfully established a secure communications session between the user operated device 140 and the computerized device 110. In other words, once the device encryption process 150 and the secure device driver process 121 have successfully engaged or entered into a secure communications session over the communications link 145, the device encryption process 150 can activate a "SECURE" light on the keyboard or other device to indicate to the user 160 that his or her input 108 will be transferred as encrypted output 109 to the computerized device 110. As a result, any encrypted user operated device output 109 intercepted by the malicious individual 170 will be unintelligible and undecipherable.

Figure 3:
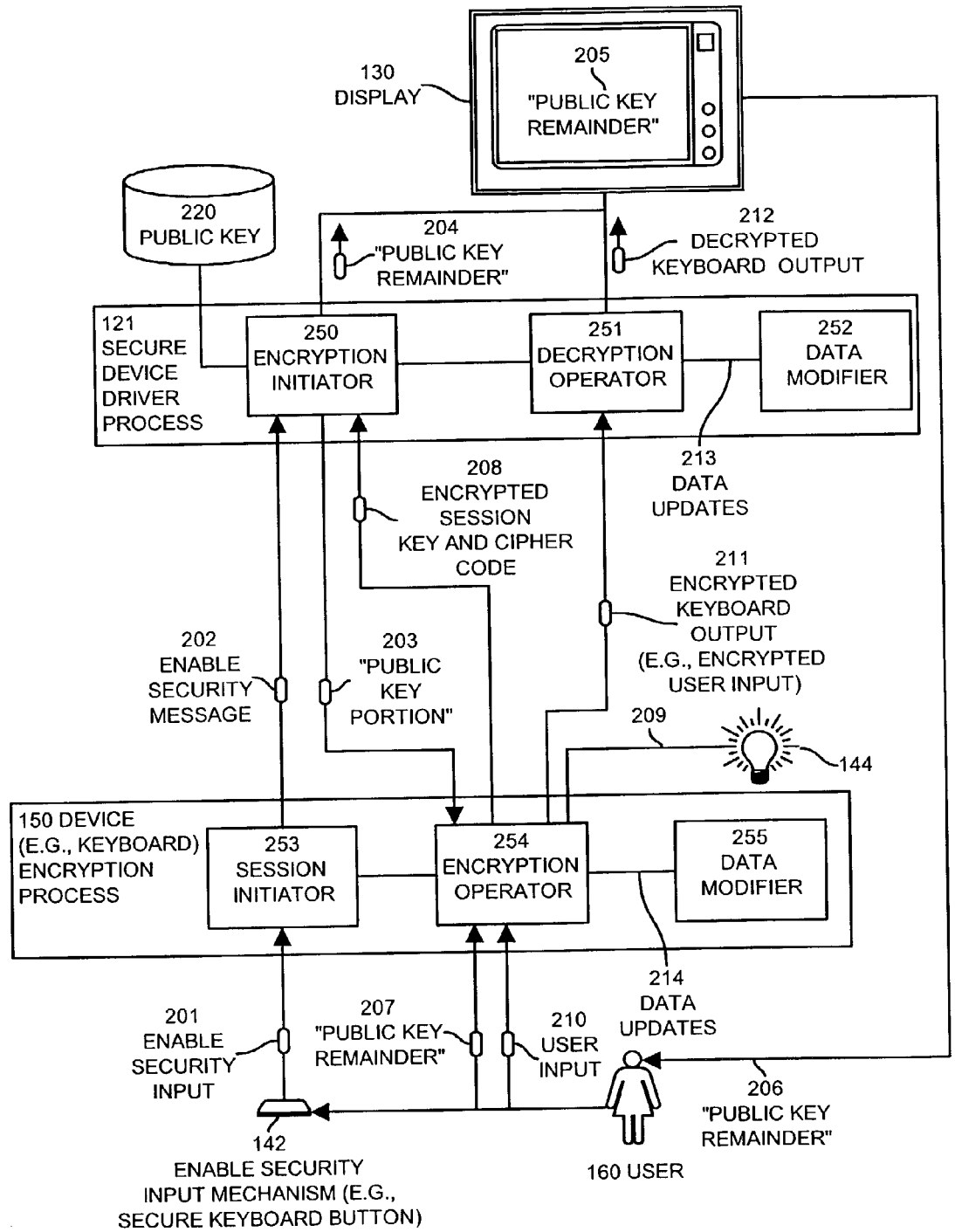
FIG. 3 illustrates details of a device encryption process operating in a user operative device and a secure device driver process operating within a computerized device in accordance with embodiments of the invention.

FIG. 3 illustrates an architecture of the secure device driver process 121 operating within the computerized device 110 and the device encryption process 150 operating within the user operated device 140 configured in accordance with example embodiments of the invention. In addition, FIG. 3 illustrates a data flow diagram of messages exchanged in order to establish a secure communications session between the two devices 110 and 140. The flow of messages between the secure device driver process 121 and the device encryption process 150 also illustrates alternative arrangements of the invention that utilize session keys and/or a data modification technique such as a cipher block chaining technique or a data padding technique (both to be explained) in order to provide additional security between the user operated device 140 and the computerized device 110 in accordance with alternative embodiments of the invention.

In this example embodiment, the secure device driver process 121 operating in the computerized device 110 includes an encryption initiator 250, a decryption operator 251 and a data modifier 252. The device encryption process 150 operating in the user operated device 140 includes a session initiator 253, an encryption operator 254 and a data modifier 255. The enable security input mechanism 142 is illustrated in this example as a secure keyboard button. The secure indicator 144 is illustrated in this example as a light bulb visible to the user 160. It is to be understood the secure indicator 144 can include any mechanism such as a light, sound speaker, or may be provided by information displayed on the display 130 or any other indicator that can signify to the user 160 that user input is being transferred in a secure manner by the device encryption process 150 operating in the user operated device 140 to the secure device driver process 120 operating in the computerized device 110.

The example embodiment illustrated in FIG. 3 performs in a manner similar to that described with respect to the example of FIG. 1, except that instead of a complete public key in first communications enablement message 103, and a fingerprint or secure hash of the public key K in the second communications enablement message 104, the secure device driver process 121 divides a complete or entire public key into two portions and provides one portion to the device encryption process in the first communications enablement message 203 and provides the second portion or remainder of the public key in the communications enablement message 204 for display on the display 130. In addition, the embodiment in FIG. 3 illustrates the use of a session key and data updates 213 and 214 used within a data modification technique such as a cipher block chaining technique or a data padding technique in order to further secure communications as will be explained.

Generally, the data modifier 255 operating within the device encryption process 150 can perform one of a variety of data modification technique in order to differentiate multiple user inputs from each other. As an example, if the user presses the same key twice, the data modifier 255 can perform a data modification technique to modify this user input such that upon encryption, the encrypted value appears differently even though the user input was the same in both cases. This prevents a malicious individual 170 from deciphering encrypted information that may be redundant. Examples of data a modification technique employed by embodiments of the invention include a cipher block chaining technique that uses synchronized cipher algorithms within each data modifier 252 and 255 in order to continually alter the user input stream by either a certain character offset based on time or by certain predefined and synchronized rolling cipher codes. Alternatively, another example is to use a data padding technique which can append or otherwise associate a generated string of characters to each user input such as a random string of a predefined link that is appended to each user input character. This "padded" data thus includes the user input along with the randomly generated data updates 214. Once encrypted, since two successive user inputs that may be the same are padded with additional random characters or data, the respective encrypted user output will appear differently. On the receiving end, once the encrypted user output is decrypted, the decryption operator 251 can remove the additional padding in order to retrieve the original user input.

It is to be understood that the cipher block chaining technique and the data padding technique are only two examples of data modification techniques that can be utilized by embodiments of the invention. Other techniques that can be used to modify user input within the user operated device in order to mask or otherwise hide patterns of user input which can then be reversed or undone at the within the recipient computerized device are intended to be covered by the scope of embodiments of this invention.

FIGS. 4 through 7 provide a flow chart of processing steps that illustrate more details concerning the operation of one example embodiment of the invention to provide a secure communications session between the user operated device 140 such as a keyboard equipped with the device encryption process 150 in the computerized device 110 operating a secure device driver process 121, such as is illustrated in FIG. 3.

In step 400 the user 160 provides an enable security input 201 to the device encryption process 150 operating within the user operated device 140. In the example illustrated in FIG. 3, the user operates the enable security input mechanism 142 by pressing the SECURE keyboard button.

In response, in step 401, the session initiator 253 transfers an enable security message 202 to the secure device driver process 121 operating in the computerized device 110.

In step 402, the secure device driver process in the computerized device 110 receives the enable security message 202. The enable security message 202 may be, for example, a sequence of signals defining a predetermined sequence of key presses that the encryption initiator 250 within the secure device driver process 121 can continuously look for in the stream of keystroke characters entered by the user 160 and transferred to the computerized device 110 of the communications link 145 (FIG. 1). In other words, when the user operates the secure keyboard button 142, this button may cause a predefined set of character sequence signals to be transmitted from the user operated keyboard device 142 the computerized device 110 which the secure device driver process 121 can detect as a predefined sequence indicating that the user desires to enter into a secure communications session. The sequence can be predefined and so random as to not normally occur in that specific order as normal user input.

In step 403, in response to the signal, the encryption initiator 250 operating in the secure device driver process 121 obtains public key information 210 from a storage location. The public key information 210 defines a public key that can be used within an asymmetric key encryption process that allows recipients of the public key to encrypt information using the public key which can then be sent in a secure manner to the computerized device 110 which can decrypt the information using a private key not known to entities outside of the computerized device 110.

Next, in step 404 to encryption initiator 250 operating within the secure device driver process 121 generates a second communications establishment message 204 based upon the public key information 210. In one embodiment of the invention, step 404 can include generating a fingerprint or secure hash of the public key as illustrated in sub-step 405. In an alternative embodiment of the invention, generation of the second communications establishment message can include dividing the public key information 210 into first and second portions as illustrated in sub-step 406. Accordingly, after processing of step 404 is complete, the second communications establishment message 204 will contain, in this example embodiment, either a fingerprint of the public key information 210 or alternatively, a portion of the public key information 210 (as illustrated in FIG. 3).

In step 407, the encryption initiator 250 operating within the secure device driver process generates a first communications enablement message including first key material. The first key material includes one of either a complete public key if the fingerprint of the public key was computed in step 405, or in the alternative embodiment, the first key material includes the first portion of the public key if the public key is divided in sub-step 406 discussed above. In other words, in step 407, the first communications enablement message 203 either contains a complete public key 210 if the second communications establishment message 204 contains a fingerprint of the public key 210, or alternatively (as illustrated in FIG. 3) contains the first portion of the public key if the second communications establishment message 204 contains the second portion of the public key. The general idea provided by this aspect of this embodiment of the invention is that the public key is communicated to the user operated device 140 in different portions that are thereafter combined, or the public key sent in its entirety and the fingerprint enables the device encryption process 150 to later verify the authenticity of the complete public key.

Next, in step 408, the encryption initiator 250 operating within the secure device driver process 121 sends, forwards, transfers or otherwise transmits the first communications enablement message 203 to the user operated device 140 (for receipt by the encryption operator 254 as illustrated in FIG. 3). The first communications enablement message 203 includes the first key material which, as explained above, is either the complete public key or the first portion of the public key 210 in these example embodiments.

In step 409, the encryption initiator 250 operating in the secure device driver process 121 displays, on the display device 130 in communications with the computerized device 110, the second communications enablement message 204 for viewing by the user 160 operating the user operated device 140. As an example, in step 409 the encryption initiator 250 causes the computerized device 110 to display (as user viewable content 205) either the fingerprint of the complete public key or the second portion of the public key. This step thus allows the user 160 of the user operated device 140 to view the display and to enter (i.e., type in this example) as input into the user operated device the second key material 205 displayed on the display of the computerized device. After processing of step 409 is complete, processing proceeds to step 410 at the top of the flow chart in FIG. 5.

Figure 4:
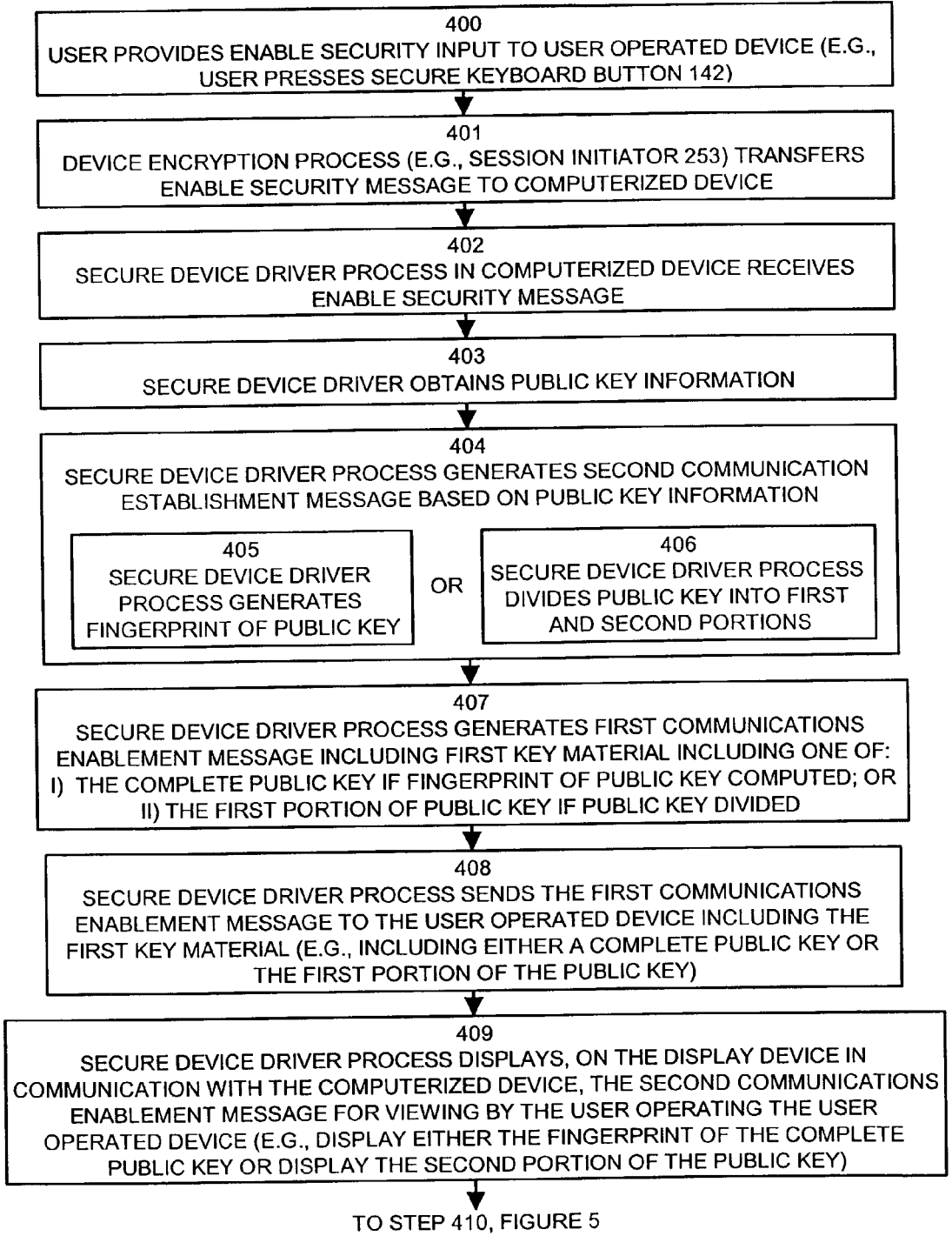
FIGS. 4 through 7 are a flow chart of processing steps that illustrate details of an example operation of embodiments of the invention.
Figure 5:
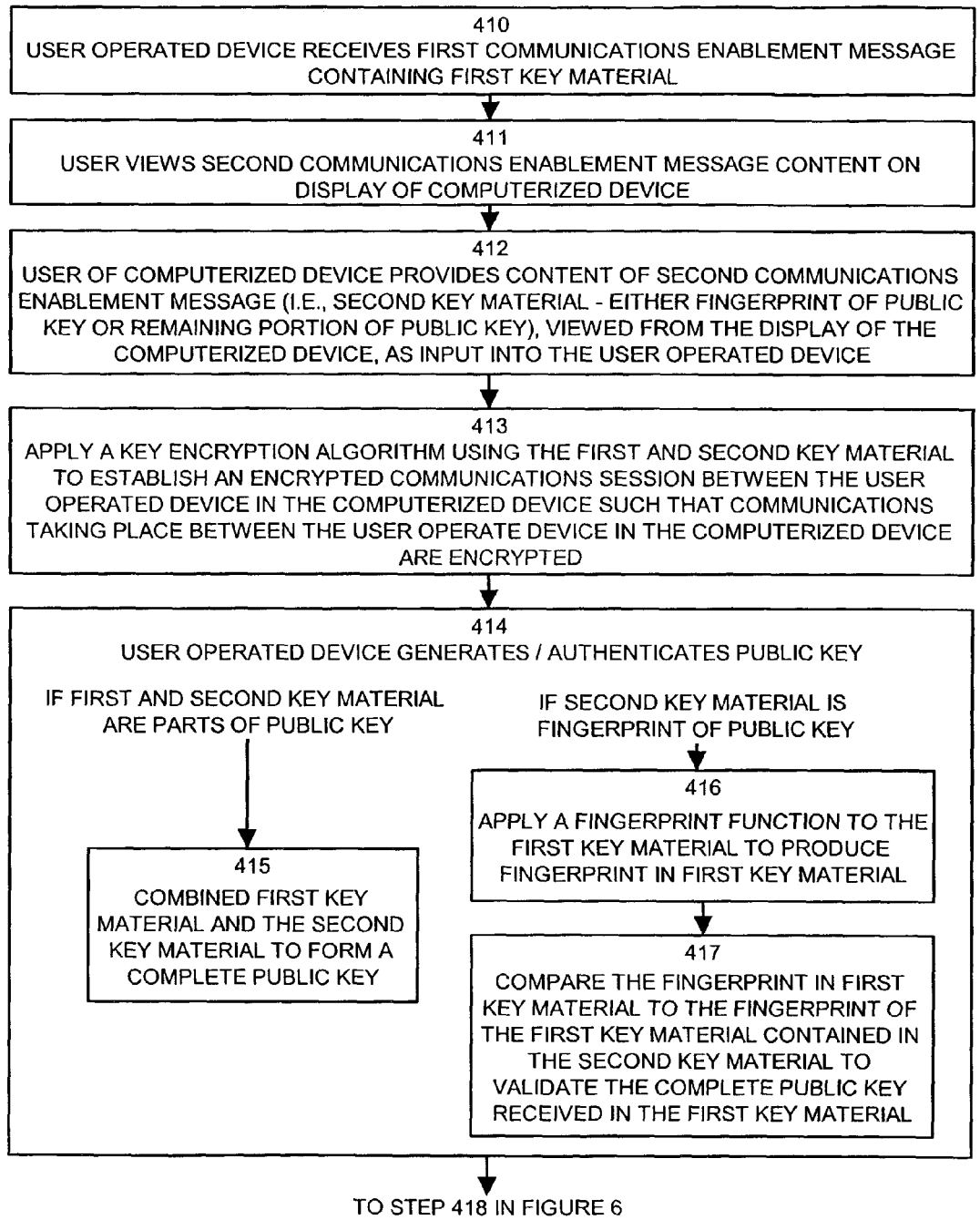

FIG. 5 is a continuation of the flow chart in FIG. 4. In step 410, the encryption operator 254 operating within the device encryption process 150 in the user operated device 140 receives the first communications enablement message 203 containing the first key material (in response to step 408 performed by the secure device driver process 121, as explained above).

In step 411, the user 160 views 206 the content 205 of the second communications enablement message 204 displayed on the display 130 of computerized device 110. In the example illustrated in FIG. 3, the content of the second communications enablement message 204 is the public key remainder or second portion of the public key that was divided in step 406 as explained above. In alternative embodiments, this content 205 can be the fingerprint of the public key.

Next, in step 412, the user 160 of the computerized device 110 provides 207 the content of the second communications enablement message 204, viewed from the display 130 of the computerized device 110, as input 207 to the encryption operator 254 operating as part of the device encryption process 150 within the user operated device 140. In other words, in steps 411 and 412, the user 160 views the second key material 205 on the display 130 of the computerized device and types in this content as input 207 in order to provide the encryption operator 254 with the remaining portion of the public key 210 that was divided in step 406 as discussed above. Recall that the encryption operator 254 already has received the first or other portion of the divided public key 210 by receiving the first communications enablement message 203 in step 410. Accordingly, in the example embodiment illustrated in FIG. 3, the encryption operator 254 obtains both the first and second key material which in this example is the first and second portions of the public key 210. As previously discussed, in an alternative embodiment of the invention, the second communications enablement message 204 can contain the fingerprint of the public key 210 which is displayed on the display 130 for viewing and entering is input by the user 160. In such cases, in step 410 key encryption operator 254 would receive the entire public key in message 203. Also as explained earlier, the messages 203 and 204 can contain challenge and response values, or any other information that the device encryption process 150 and secure device driver process 121 can use to create key values to establish a secure communications session.

In step 413, the encryption operator 254 within the device encryption process 150 applies a key encryption algorithm using the first and second key material to establish an encrypted communications session between the user operated device 140 and the computerized device 110 such that communications taking place between these devices are encrypted.

Figure 6:
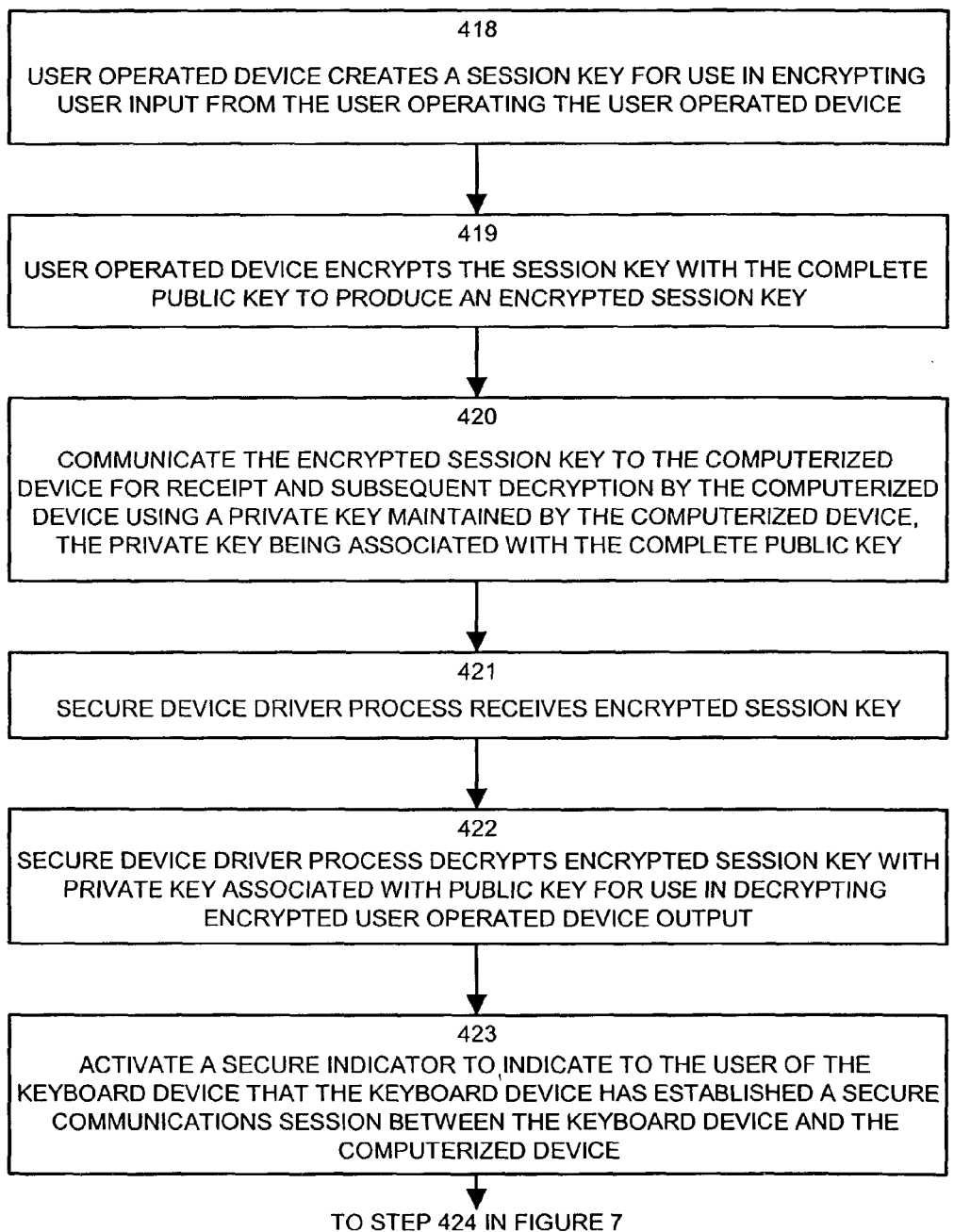
Figure 7:
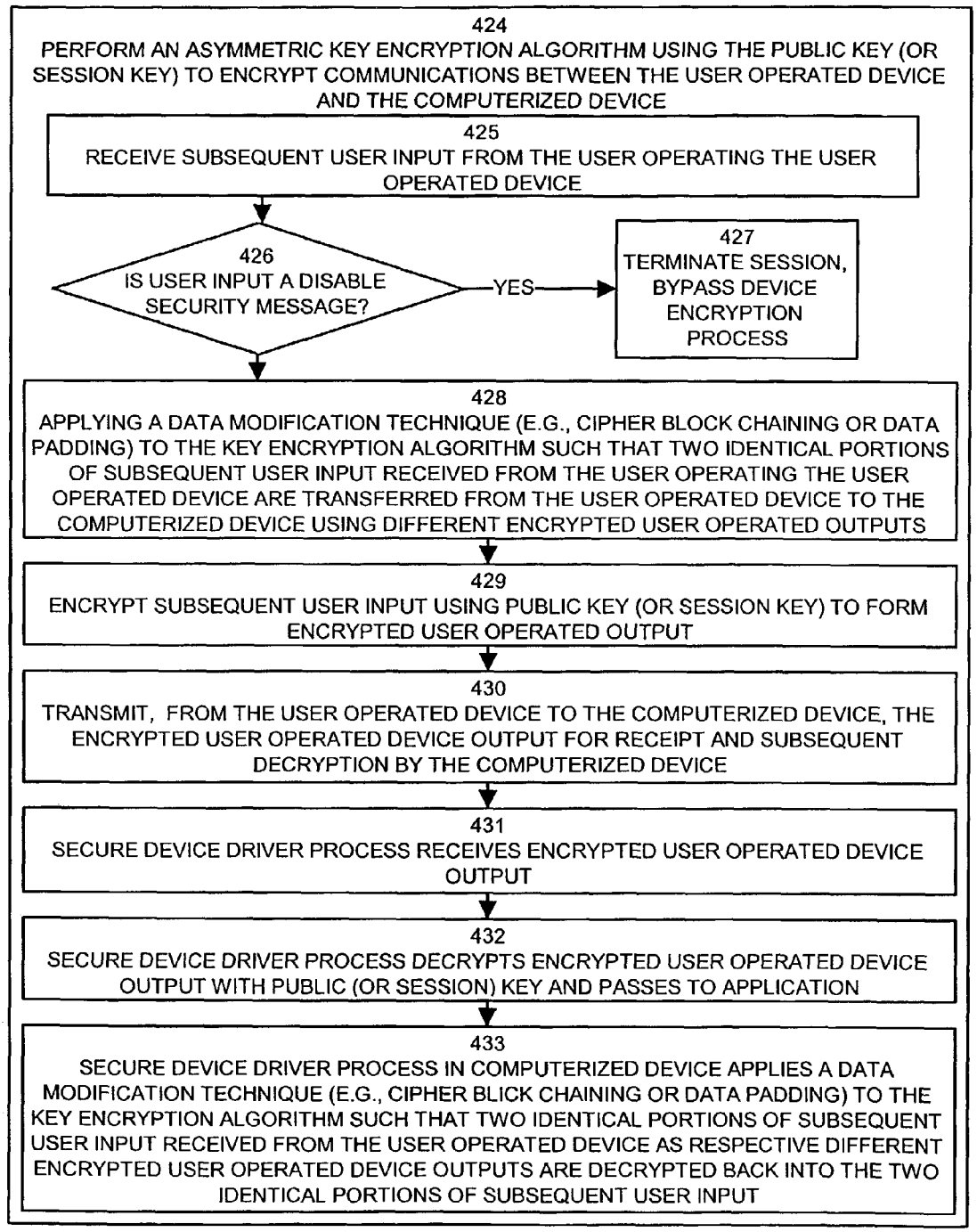

Generally, the remaining steps of the flow charts in FIGS. 5 through 7 show processing operations involved to allow the device encryption process 150 to utilize the first and second key material to perform an encrypted communications session with the computerized device 110.

In step 414, the encryption operator 254 within the user operated device 140 generates or authenticates the public key 210 received within the first key material or via the combination of the first and second key material. In particular, as illustrated within step 414, if the first and second key material are parts of the public key 210, processing proceeds to step 415.

In step 415, the encryption operator 254 operating within the device encryption process 150 combines the first key material and the second key material to form the complete or entire public key 210.

Alternatively, in step 414 if the second key material is the fingerprint of the public key 210, processing proceeds to steps 416 and 417.

In step 416, the encryption operator 254 applies a fingerprint function to the first key material to produce a new fingerprint of the first key material. In other words, the encryption operator 254 applies the same fingerprint function that the encryption initiator 250 applied to generate content for the second communications enablement message 205 to the first communications enablement message in order to generate a fingerprint of the public key received within the first communications enablement message 203.

Next, in step 417, the encryption operator 254 compares the newly computed fingerprint of the first key material to the fingerprint of the first key material contained within the second key material (205) to validate the complete public key received within the first key material. In other words, if the first communications enablement message 203 contains the entire public key 210 and the second communications enablement message 204 contains a fingerprint of the public key, the authenticity of the entire public key 210 received within the first communications enablement message 203 can be tested by the encryption operator 254 by applying the same fingerprint function to the public key 210 (received in message 203) and comparing the two fingerprint values to ensure that they are the same. If the fingerprints match, then the encryption operator 254 can be assured that the public key 210 contained within the first key material 203 is authentic and has not been intercepted or tampered with by a malicious individual 170. If they do not match, processing cannot continue since the public key cannot be verified. After generation and authentication of the public key is complete in step 414, processing proceeds to step 418 in FIG. 6.

FIG. 6 is a continuation of the flow chart from FIGS. 4 and 5. In step 418, the encryption operator 254 (i.e., the user operated device 140) creates a session key for use in encrypting user input 210 from the user 160 operating the user operated device 140. Those familiar with public key encryption technologies understand that the session key can be created or generated in a variety of ways known to those skilled in the art. The session key is an encryption key that be used to encrypt all subsequently received user input for transfer to the computerized device 110. After generation or creation of the session key in step 418, processing proceeds to step 419.

In step 419, the user operated device (i.e., the encryption operator 254) encrypts the session key with the complete public key 210 to produce an encrypted session key.

Next, in step 420, the encryption operator 254 communicates encrypted session key 208 (FIG. 3) to the computerized device for receipt and subsequent decryption by the secure device driver process 121 using a private key maintained by the encryption initiator 250.

In addition, as illustrated in FIG. 3, the encryption operator 254 in step 420 can employ a data modification technique such as by transferring a data update 214 including a cipher code generated by the data modifier 255. The data update 214 including a cipher code or cipher update can be utilized, as will be explained shortly, to synchronize a cipher block chaining technique employed within the public key encryption algorithm. The cipher code in the data update 214 and cipher block chaining technique provides a rolling or changing code which can be combined with encrypted data (or data to be encrypted) in order to cause repetitive information provided by the user 160 to the user operated device 140 to be encrypted differently each time. For example, multiple keystrokes of the same key will appear differently in an encrypted form in a data stream when the encryption process uses a cipher code or update 214, 213. Accordingly, in step 420 and 421, the encryption operator 254 provides a session key and a cipher code (to synchronize the data modifiers 252 and 255) to the encryption initiator 250 within the computerized device 210. At this point, the computerized device 210 has enough information to begin decrypting the user data when it beings to arrive in encrypted form from the user operated device 140.

In step 421, the secure device driver process (i.e., the encryption initiator 250) receives the encrypted session key 208.

In step 422, the encryption initiator 250 operating within the secure device driver process 121 decrypts the encrypted session key with a private key associated with public key 210. The session key is used thereafter for decrypting encrypted user operated device output. The private key is associated with the complete public key 210 according to public and private key generation technology known to those skilled in the art. In other words, in steps 420 through 422, the encryption operator 254 in the user operated device 140 transfers the session key in an encrypted form for receipt by the encryption initiator 250 in the secure device driver process 121. The encryption initiator 250 then decrypts the encrypted session key using the public key 210. This provides the session key to the encryption initiator 250 and thus the computerized device 110 can thereafter use the session key for decryption of subsequently provided and encrypted user input received from the user operated device 140.

In step 423, the encryption operator 254 operating in the device encryption process 150 activates a secure indicator 144 such as a light, sound or other human detectable indicator to indicate to the user 160 of the user operated device 140 that the user operated device has now established a secure communications session between the user operated device 140 and the computerized device 110. After processing step 423 is complete processing proceeds to step 424 at the top of FIG. 7.

FIG. 7 is a continuation of the flow chart from FIG. 6. In step 424, the device encryption process 150 operating within the secure device driver process 121 operates in a continuous manner to perform an asymmetric (in this example embodiment) key encryption algorithm using the public key (or the session key in the example illustrated in FIG. 3) in order to encrypt communications between the user operated device 140 and the computerized device 110.

Specifically, in step 425, the encryption operator 254 within the device encryption process 150 receives subsequent user input 210 from the user 160 operating the user operated device 140. The subsequent user input 210 may be, for example, any type of user input 210 that the user 160 can provide to the user operated device 140 such as keystrokes, button presses, audio or voice signals, electro-mechanical signal inputs such as mouse button presses or movements or joystick movements or any other type of signaling information that needs to be transmitted to the computerized device 110.

In step 426, the encryption operator 254 determines if the user input 210 is a disable security message. Generally, the user 160 can provide a disabled security message as input by again operating the enable security input mechanism 142 in order to indicate to the user operated device 142 that the user no longer desires to have his or her input transmitted to the computerized device in an encrypted form. In the example in FIG. 3, the user 160 can press the enable security input mechanism secure keyboard button 142 a second time to turn off the encrypted communications session once activated. If this occurs, processing proceeds to step 427.

In step 427, the encryption operator 254 terminates the encrypted communications session causing any subsequent user input 210 to bypass the encryption process explained herein and thus all subsequent user input is transmitted to the computerized device 110 in a "clear text" or non-encrypted form. The secure indicator 144 is also turned off in this step to indicate to the user that the secure session has ended.

Assuming for this example of the user is not provided a disabled security message, processing proceeds from step 426 to step 428.

Next, in step 428, the encryption operator 254 applies a data modification technique such as a cipher block chaining technique or a data padding technqiue to the key encryption algorithm such that two identical portions of subsequent user input received from the user operating the user operated device 140 (e.g., two identical keystrokes) are transferred from the user operated device 142 computerized device 110 using different encrypted user operated outputs (i.e., are converted into different encrypted signals).

As illustrated in FIG. 3, when using a data modification technique such as a cipher block chaining technique, the data modifier 255 in the device encryption process 150 and the data modifier 252 in the secure device driver process 121 can operate in synchronicity with each other after the exchange of the cipher code in the message 208, which takes place at the beginning of the establishment of the encrypted communications session when using a cipher block chaining technique. Thereafter, each data modifier 252 and 255 can produce a rolling cipher code or cipher update 213 and 214 respectively. The cipher updates 214 and 213 (i.e., data updates containing information that can modify user input data) can be applied during encryption and subsequent decryption of user input 210 by the encryption operator 254 and the decryption operator 251 such that two identical (and possibly sequential) user inputs such as two keystrokes to the same key are encrypted into different encrypted outputs. By using a cipher block chaining technique and by encrypting information using cipher updates that are continually changing, any malicious individual 170 (Dr. Evil in FIG. 1) that may be intercepting the encrypted communications and who may be looking for patterns in this encrypted information 211 will be unsuccessful. Accordingly, after step 429 is complete, the encryption operator 254 has produced an encrypted version of the user input 210 for transmission to the secure device driver process 121 for decryption.

In an alternative embodiment, the data modification technique applied in step 428 is a data padding technique in which the data modifier 255 can supply data updates 214 that are not rolling cipher quotes but instead, that contain a randomized string of characters that may be, for example, of a predetermined or preset length (e.g., six characters). According to the data padding technique, this randomized string of characters within the data updates 214 can be combined (e.g., appended or used as a prefix) with the user input 210 in order to produce a character string that can be encrypted. Each successive user input 210 such as multiple keystrokes, can be combined with a different data update 214 such that two similar (e.g., identical) user inputs such as two keystrokes that are the same will be combined with different randomized character strings. As an example, if the user presses the "A" key twice, the first press of the "A" key may be combined with a data update 214 containing the random character string "asdfgh" to produce a resulting string "Aasdfgh" which will be encrypted to produce a first encrypted keyboard output 211. The second user press of the "A" key can be combined with a different data update 214 that may contain, for example, the random character string "qwerty" to produce a resulting string "Aqwerty" which, once encrypted, produces a completely different encrypted keyboard output string 211. Accordingly, when character strings of user input 210 are combined with different random character string data updates 214 and are then encrypted, two identical user inputs 210 will produce different encrypted user output 211 that differentiate themselves for each other. This avoids the malicious individual 170 for detecting patterns in the encrypted user input 210. As will be explained shortly, the secure device driver process 121 aware of this data modification technique can simply decrypt the encrypted keyboard output 211 and remove the predetermined number of characters (e.g., six characters in the aforementioned example) from the decrypted keyboard output in order to produce the original user input 210.

In step 429, the encryption operator 254 encrypts the subsequent user input 210 such as individual user keystrokes using the public key or the session key (depending upon the embodiment in use) to form the encrypted user operated device output 211. Note that this process can include encrypting the user input that has been combined, using one or the data modification techniques explained above, with the rolling cipher text or with the data padding in order to disguise the user input in excrypted for from similar user input.

In step 430, the encryption operator 254 operating within the device encryption process 150 transmits, from the user operated device 140 to the computerized device 110, the encrypted user operated device output 211 for receipt and subsequent decryption by the computerized device 110.

Upon receipt, in step 431, the decryption operator 251 operating in the secure device driver process 121 receives the encrypted user operated device output 211. Depending upon the embodiment, this output 211 from the user operated device 140 may be encrypted with a public key, a session key, or another key value and may include an application of the cipher block chaining technique (as in the example in FIG. 3).

Next, in step 432, the decryption operator 251 operating within the secure device driver process 121 decrypts the encrypted user operated device output 211 using the public key or the session key (depending upon the embodiment) and passes this decrypted output to an application to which the user 160 is interacting.

In step 433, the decryption operator 251 operating in the secure device driver process 121 in the computerized device 110 applies data modification technique such as a reverse of the formerly explained cipher block chaining technique or the data padding technique to the key encryption algorithm such that two identical portions of subsequent user input 410, received from the user operated device as respective different encrypted user operated device outputs 411, are decrypted back into the two identical portions of subsequent user input. In step 433, for the cipher block chaining technique, the decryption operator 251 uses the identical cipher update 213 that the encryption operator 254 applied (i.e., cipher update 214) to encrypt subsequent user input 210 in order to reproduce that user input 210 in encrypted form.

As an example, if the user 160 presses the keystroke "a" multiple times in rapid succession, embodiments of the invention can apply the cipher block chaining technique by obtaining a different cipher update 214 for each of these individual "a" keystrokes such that the first keystroke "a" will be encrypted (in steps 428 and 429) and then, due to the cipher block chaining technique, will be converted into an encrypted value that is different than the second keystroke "a". Likewise, for a third keystroke "a" yet another cipher update 214 can be used to produce yet a different encrypted value. This process can be repeated for each character or individual user input provided such that no two user inputs that are identical are transferred over the communications link 145 using the same stream of encrypted data. This avoids the possibility that the malicious individual 170 can attempt to intercept the encrypted communications stream in order to detect patterns of encryption and thus attempt to deduce which encryption patterns match which particular keystrokes. By continually using the different cipher updates 214 for encryption and 213 for decryption, no two keystrokes are encrypted in the same manner.

Likewise, as explained above with respect to the data modification technique including data padding, in step 433 the decryption operator 251 can remove the extra characters that the encryption operator 254 appended to the original user input 210 in order to reproduce the original user input 210. One difference between the cipher block chaining technique and the data padding technique is that the cipher block chaining technique requires each data modifier 252 and 255 to be synchronized with each other at the beginning of the communications session whereas the data padding technique does not require such synchronization but instead, only the requires that the encryption operator 254 and the decryption operator 251 are in agreement with respect to how many additional characters the user input is padded with prior to encryption. In addition, the cipher block chaining technique is susceptible to a situation in which each data modifier 252 and 255 somehow becomes out of synchronization with each other with respect to the particular rolling cipher codes 213 and 214 (i.e., the data updates for the cipher blick chaining technique) that each is using to encrypt and then subsequently decrypt user input 210. If the data modifiers 252 and 255 become unsynchronized with each other with respect to what actual cipher codes 213 and 214 should be used to encrypt and/or decrypt data, accurate decryption may become difficult or impossible. The data padding technique is not susceptible to such vulnerabilities since each user input (e.g., each character key press) is encoded with data padding of a known length. Accordingly, there is no need for synchronization using the data padding data modification technique and if one portion of encrypted user input becomes corrupted, this does not affect the ability to decrypt another user key press that is combined with a different data update character string 214.

It is to be understood that other techniques or modifications to the cipher block chaining technique and the data padding technique can be used to alter successive user inputs so that identical patterns within an encrypted data stream cannot be detected. As an example, the aforementioned data padding technique was explained with respect to appending a random character string 214 of a predetermined length to the end of a received user input 210. It is to be understood that variations to this could include appending a randomized character string 214 to the beginning of user input or a more elaborate scheme can be used in which the user input 210 is placed at a predetermined and potentially changing offset or location within the randomly generated string of characters within the data update 214.

After step 433 is complete, processing can repeat and returns to step 425 to receive further subsequent user input 210, such as the next keystroke on the keyboard device provided for the user 160. In this manner, high-speed processing of steps 425 to 433 in a manner at least as fast as successive user inputs allows this embodiment of the invention to continually encrypt user input 210 for transmission to the computerized device 110 without fear of it being usefully intercepted by a malicious individual 170.

It is to be understood that the particular key encryption algorithm applied to encrypt user input 210 can vary depending upon the application of the user operated device 140. As an example, since the keyboard device embodiments can convert an actual user input keystroke 210 into a plurality of other keystrokes, no new signaling changes are required to be implemented within the computerized device input output interface 115 (FIG. 1) to which the user operated device 140 couples to the computerized device 110. In other words, encryption according to embodiments of the invention can entail conversion of one user input from a form that would be allowable to be transmitted over the communications link 145 without encryption to a second form that is also allowed to be transmitted over the communications link 145 if encryption were not present, such as multiple keystrokes. Accordingly, the underlying protocol for the physical layer of the communications link 145 does not require changes, nor are such changes required to the hardware in order to transmit the encrypted version of the user input 210 to the computerized device 110.

Using the keystroke example above, if embodiments of the invention encrypt each individual user input keystroke 210 into a set of multiple keystroke signals, the communications link 145 is readily equipped to handle transmission of such a set of multiple keystrokes as if they had been typed individually. In addition, if the cipher block chaining technique is operational, the cipher block chaining technique can change both the content of two identical sequentially entered keystrokes such that the number or amount of alternative keystrokes into which those identical keystrokes are encrypted constantly changes. As a result, not only will the content of two identical user inputs be different when they are in an encrypted form, the number of keystrokes used to represent these two identical keystrokes can change to further thwart attempts by a malicious individual 170 to intercept and decrypt encrypted user input 211.

In this manner, embodiments of the invention provide a technique to allow a user 160 to install the user operated device 140 such as a keyboard device equipped with an embodiment of the invention onto a computerized device 110 that provides a standard conventional input output interface for user operated device is of this type. In other words, the user 160 can couple the keyboard device 140 equipped and configured according to embodiments of the invention onto a standard keyboard port of a personal computer system. The user 160 is then able to load the secure device driver software process 121 into the computerized device that operates as explained herein to provide the user 160 with the ability to enter into a secured communications session with the computerized device.

Those skilled in the art will understand that there can be many variations made to the embodiments explained above while still achieving the same objective of those embodiments and the invention in general. As an example, rearrangement of the processing steps in the flow charts may be performed by those skilled in the art while still achieving the objectives of embodiments of the invention as explained herein. Such variations are intended to be covered by the scope of this invention. As such, the foregoing description of embodiments of the invention is not intended to be limiting. Rather, any limitations to the invention are presented in the following claims.

What is claimed is:

1. In a user operated input device that provides user input to a computerized device, a method for establishing a secure communications session between the user operated input device and the computerized device in communications with the user operated input device, the method comprising:

transferring an enable security message from the user operated input device to the computerized device via a first interface of the user operated input device;

receiving, at the first interface of the user operated input device, a first communications enablement message from the computerized device, the first communications enablement message including first key material generated by the computerized device, the first key material being a complete public key transmitted to the user operated input device from the computerized device;

receiving, at a second user interface of the user operated input device, a copy of a fingerprint of the first key material via input from a user operating the user operated input device to send to the computerized device, the fingerprint of the first key material having been displayed to the user on a display device coupled to the computerized device, wherein the copy of the fingerprint of the first key material is transmitted to the computerized device;

upon determining, by the computerized device, that the copy of the fingerprint of the first key material matches the fingerprint of the first key material, establishing an encrypted communications session between the user operated input device and the computerized device using the first communications enablement message; and applying an encryption algorithm using at least the first key material to establish the encrypted communications session between the user operated input device and the computerized device such that subsequent communications taking place between the user operated input device and the computerized device are encrypted.

2. The method of claim 1 wherein:

the step of applying an encryption algorithm using the first key material comprises:

performing an asymmetric key encryption algorithm using the complete public key to encrypt communications between the user operated input device and the computerized device.

3. The method of claim 1 wherein the fingerprint of the first key material is a secure hash of at least a portion of the first key material.

4. The method of claim 1 wherein applying an encryption algorithm using the first key material to establish an encrypted communications session between the user operated input device and the computerized device comprises:

applying a data modification technique including at least one of a cipher block chaining technique and a data padding technique to the encryption algorithm such that two identical portions of subsequent input received from the user operated input device are transferred from the user operated input device to the computerized device using different outputs.

5. The method of claim 1 wherein transferring an enable security message comprises:

receiving an enable security input from the user, the enable security input indicating that the user desires to establish the secure communications session between the user operated input device and the computerized device.

6. The method of claim 1 wherein establishing the encrypted communications session between the user operated input device and the computerized device comprises:
  activating a secure indicator to indicate to the user that the user operated input device has established the encrypted communications session between the user operated input device and the computerized device.

7. The method of claim 1 comprising:
  receiving, as input from a user, a disable security message; and
  in response to the step of receiving the disable security message, disestablishing the secure communications session between the user operated input device and the computerized device such that the user operated input device and the computerized device can communicate in a non-secure manner.

8. The method of claim 1 wherein establishing a the encrypted communications session between the user operated input device and the computerized device comprises:
  applying at least one of:
    i. a symmetric key encryption technique; and
    ii. a data modification technique including at least one of a cipher block chaining technique and a data padding technique;
  to establish and maintain the encrypted communications session between the user operated input device and the computerized device such that subsequent input received by the user operated input device is encrypted and transmitted to the computerized device as encrypted data.

9. The method of claim 1 wherein the user operated input device is a keyboard.

10. The method of claim 1 wherein the user operated input device is a mouse.

11. The method of claim 1 wherein the user operated input device is at least one of a joystick, a touchpad, a trackball, a keypad, and an electronic notepad.

12. In a computerized device, a method for establishing a secure communications session between the computerized device and a user operated input device that provides user input to the computerized device, the method comprising the steps of:
  receiving an enable security message from the user operated input device in communications with the computerized device;
  in response to the enable security message, generating, by the computerized device, first key material to send to the first interface of the user operated input device;
  sending a first communications enablement message to the user operated input device, the first communications enablement message including the first key material, the first key material being a complete public key transmitted to the user operated input device from the computerized device;
  displaying, on a display device in communications with the computerized device, a second communications enablement message for viewing by a user, the second communications enablement message including second key material containing a fingerprint of the first key material;
  responsive to the displayed second communications enablement message (i) having been input to the user operated input device and (ii) matching the displayed fingerprint of the first key material, establishing an encrypted communications session between the user operated input device and the computerized device based on the first communications enablement message and the second communications enablement message; and
  applying an encryption algorithm using at least the first key material to establish the encrypted communications session between the user operated input device and the computerized device such that the communications taking place between the user operated input device and the computerized device are encrypted.

13. A user operated input device that provides user input to a computerized device comprising:
  a user input mechanism;
  a communications interface that can be engaged in communications with a computerized device;
  a memory;
  a processor;
  an interconnection mechanism coupling the user input mechanism, the communications interface, the memory and the processor;
  wherein the memory is encoded with a device encryption application that when executed in conjunction with the processor provides a device encryption process that establishes a secure communications session between the user operated input device and the computerized device in communications with the user operated input device by performing the steps of:
  transferring, from the user operated input device to the computerized device over the communications interface, an enable security message;
  receiving, over the communications interface, a first communications enablement message, the first communications enablement message including first key material generated by the computerized device, the first key material being a complete public key transmitted to the user operated input device from the computerized device;
  receiving, as input from a user operating the user operated input device via the user input mechanism, a second communications enablement message, the second communications enablement message including second key material containing a copy of a fingerprint of the first key material, the fingerprint of the first key material having been displayed to the user on a display device coupled to the computerized device, wherein the copy of the fingerprint of the first key material is transmitted to the computerized device;
  upon determining, by the computerized device, that the copy of the fingerprint of the first key material matches the displayed fingerprint of the first key material, establishing an encrypted communications session between the user operated input device and the computerized device over the communications interface using the first communications enablement message and the second communications enablement message; and
  applying an encryption algorithm using at least the first material to establish the encrypted communications session between the user operated input device and the computerized device such that the communications taking place between the user operated input device and the computerized device are encrypted.

14. The user operated input device of claim 13 wherein:
  when the user operated input device performs the step of applying an encryption algorithm using at least the first key material, the user operated input device performs the steps of:
    performing an asymmetric key encryption algorithm using the complete public key to encrypt communications between the user operated input device and the computerized device over the communications interface.

15. The user operated input device of claim 14 wherein the user operated input device performs the steps of:
   receiving subsequent user input;
   encrypting the subsequent user input to form encrypted output; and
   transmitting, from the user operated input device to the computerized device, the encrypted output for receipt and subsequent decryption by the computerized device.

16. The user operated input device of claim 15 wherein the user operated input device performs the step of:
   encrypting the subsequent user input using the complete public key.

17. The user operated input device of claim 15 wherein the user operated input device performs the steps of:
   creating a session key for use in encrypting user input from the user operating the user operated input device;
   encrypting the session key with the complete public key to produce an encrypted session key;
   communicating the encrypted session key to the computerized device for receipt and subsequent decryption by the computerized device using a private key maintained by the computerized device, the private key being associated with the complete public key; and
   wherein when the user operated input device performs the step of encrypting the subsequent user input, the user operated input device performs the step of:
   encrypting the subsequent user input using the session key such that the encrypted output can be decrypted by the computerized device using the session key communicated to and decrypted by the computerized device.

18. The user operated input device of claim 13 wherein the user operated input device performs the steps of:
   applying a fingerprint function to the first key material to produce fingerprinted first key material;
   comparing the fingerprinted first key material to the fingerprint of the first key material contained in the second key material to validate the complete public key received in the first key material; and
   performing an asymmetric key encryption algorithm using the complete public key to encrypt communications between the user operated input device and the computerized device.

19. The user operated input device of claim 18 wherein the fingerprint on the first key material is a secure hash of at least a portion of the first key material.

20. The user operated input device of claim 13 wherein, when the input device performs the step of applying an encryption algorithm using at least the first key material to establish an encrypted communications session between the input device and the computerized device, the input device performs the step of:
   applying a data modification technique including at least one of a cipher block chaining technique and a data padding technique to the encryption algorithm such that two identical portions of subsequent input received from the input device are transferred to the computerized device over the communications interface using different encrypted outputs.

21. The user operated input device of claim 13 wherein when the input device performs the step of transferring an enable security message, the input device further performs the step of:
   receiving an enable security input from the user, the enable security input indicating that the user desires to establish the secure communications session between the input device and the computerized device over the communications interface.

22. The user operated input device of claim 13 wherein when the user operated input device performs the step of establishing an encrypted communications session between the user operated input device and the computerized device, the user operated input device performs the step of:
   activating a secure indicator coupled to the user operated input device to indicate to the user that the user operated input device has established the encrypted communications session between the user operated input device and the computerized device.

23. The user operated input device of claim 13 wherein the user operated input device performs the steps of:
   receiving, as input from a user, a disable security message; and
   in response to the step of receiving the disable security message, disestablishing the secure communications session between the user operated input device and the computerized device such that the user operated input device and the computerized device can communicate in a non-secure manner.

24. The user operated input device of claim 13 wherein when the user operated input device performs the step of establishing an encrypted communications session between the user operated input device and the computerized device, the user operated device performs the step of:
   applying at least one of:
   i. a symmetric key encryption technique;
   ii. an asymmetric key encryption technique; and
   iii. a data modification technique including at least one of a cipher block chaining technique and a data padding technique;
   to establish and maintain the secure communications session between the user operated input device and the computerized device such that subsequent user input received by the user operated input device is encrypted and transmitted to the computerized device as encrypted output.

25. An apparatus, comprising:
   a user operated input device; and
   a computerized device configured to receive input from the user operated input device including at least:
      a display interface capable of being coupled to a display device that presents information to a user,
      a communications interface, coupled to the computerized device, capable of being coupled to and communicating with the user operated input device,
      a memory,
      a processor,
      an interconnection mechanism coupling the display interface, the communications interface, the memory and the processor;
   wherein the memory is encoded with a secure device driver application that, when executed by the processor, produces a secure device driver process that causes the computerized device to establish a secure communications session between the computerized device and the user operated input device, by causing the computerized device to perform the steps of:
      receiving, over the communications interface, an enable security message from the user operated input device in communications with the computerized device;
      in response to the enable security message, obtaining, by the secure device driver application, first key material generated by the computerized device to send to the user operated input device;

sending a first communications enablement message to the user operated input device over the communications interface, the first communications enablement message including the first key material, the first key material being a complete public key transmitted to the user operated input device from the computerized device;

displaying, on the display device, a second communications enablement message for viewing by the user operating the user operated input device, the second communications enablement message including a fingerprint of the first key material;

responsive to the displayed second communications enablement message (i) having been input to the user operated input device and (ii) matching the displayed fingerprint of the first key material, establishing an encrypted communications session between the user operated input device and the computerized device over the communications interface based on the first communications enablement message and the second communications enablement message; and applying an encryption algorithm using at least the first key material to establish the encrypted communications session between the user operated input device and the computerized device such that the communications taking place between the user operated input device and the computerized device are encrypted.

26. The apparatus of claim 25 wherein when the computerized device performs the step of applying an encryption algorithm using at least one of the first and second key material to establish an encrypted communications session between the user operated input device and the computerized device, the computerized device performs the step of:

applying a data modification technique including at least one of a cipher block chaining technique and a data padding technique to the encryption algorithm such that two identical portions of subsequent user input received from the user operated input device as respective different outputs are decrypted back into the two identical portions of subsequent user input.

27. A non-transitory computer-readable storage medium including computer program logic encoded thereon that, when performed in a user operated input device coupled to a computerized device, causes the user operated input device to perform the operations of:

transferring an enable security message from the user operated input device to the computerized device via a first interface of the user operated input device;

receiving, at the first interface of the user operated input device, a first communications enablement message from the computerized device, the first communications enablement message including first key material generated by the computerized device, the first key material being a complete public key transmitted to the user operated input device from the computerized device;

receiving, at a second user interface of the user operated input device, a second communications enablement message as input from a user operating the user operated input device, the second communications enablement message including second key material containing a fingerprint of the first key material, the fingerprint of the first key material having been displayed to the user on a display device coupled to the computerized device, wherein the copy of the fingerprint of the first key material is transmitted to the computerized device;

upon determining, by the computerized device, that the copy of the fingerprint of the first key material matches the fingerprint of the first key material, establishing an encrypted communications session between the user operated input device and the computerized device using the first communications enablement message and the second communications enablement message; and applying an encryption algorithm using at least one of the first and second key material to establish the encrypted communications session between the user operated input device and the computerized device such that the communications taking place between the user operated input device and the computerized device are encrypted.

28. A non-transitory computer-readable storage medium including computer program logic encoded thereon that, when performed in a computerized device having a coupling to a user operated input device that provides user input to the computerized device, causes the computerized device to perform the operations of:

receiving an enable security message from the user operated input device in communications with the computerized device;

in response to the enable security message, generating first key material to send to the user operated input device;

sending a first communication enablement message to the user operated input device, the first communications enablement message including the first key material, the first key material being a complete public key transmitted to the user operated input device from the computerized device;

displaying, on a display device in communications with the computerized device, a second communications enablement message for viewing by a user operating the user operated input device, the second communications enablement message including second key material containing a fingerprint of the first key material that the computerized device displays on the display device of the computerized device and that the user can see and can provide as input to the user operated input device for receipt of the second communications enablement message;

responsive to the displayed second communications enablement message (i) having been input to the user operated input device and (ii) matching the displayed fingerprint of the first key material, establishing an encrypted communications session between the user operated input device and the computerized device based on the first communications enablement message and the second communications enablement message; and applying an encryption algorithm using at least one of the first and second key material to establish the encrypted communications session between the user operated input device and the computerized device such that the communications taking place between the user operated input device and the computerized device are encrypted.

* * * * *

UNITED STATES PATENT AND TRADEMARK OFFICE
CERTIFICATE OF CORRECTION

| | | |
|---|---|---|
| PATENT NO. | : 8,180,051 B1 | Page 1 of 1 |
| APPLICATION NO. | : 10/265983 | |
| DATED | : May 15, 2012 | |
| INVENTOR(S) | : O'Toole, Jr. | |

It is certified that error appears in the above-identified patent and that said Letters Patent is hereby corrected as shown below:

In the Summary of the Invention:

Column 3, Line 41, please delete "Zeland" and insert -- Zealand -- therefor;

Column 5, Line 65, please delete "form" and insert -- from -- therefor;

In the Detailed Description of Embodiments:

Column 12, Line 43, please delete "form" and insert -- from -- therefor;

Column 24, Line 22, please delete "technqiue" and insert -- technique -- therefor;

Column 25, Line 32, please delete "excrypted" and insert -- encrypted -- therefor;

Column 26, Line 37, please delete "blick" and insert -- block -- therefor;

In the Claims:

Column 29, Claim 8, Line 17, please delete "a";

Column 32, Claim 25, Line 52, please insert -- and -- after processor.

Signed and Sealed this
Twenty-eighth Day of August, 2012

David J. Kappos
*Director of the United States Patent and Trademark Office*